(12) United States Patent
DeWitt et al.

(10) Patent No.: US 12,234,093 B2
(45) Date of Patent: *Feb. 25, 2025

(54) METHOD AND APPARATUS FOR SORTING OR RETRIEVING ITEMS

(71) Applicant: OPEX Corporation, Moorestown, NJ (US)

(72) Inventors: Robert R. DeWitt, Marlton, NJ (US); Peter M. Chezik, Sicklerville, NJ (US); Joseph Valinsky, Turnersville, NJ (US); S. N. Kartik, Lawrenceville, NJ (US); Ola Stahl, Cape May, NJ (US)

(73) Assignee: OPEX Corporation, Moorestown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/378,888

(22) Filed: Oct. 11, 2023

(65) Prior Publication Data

US 2024/0109723 A1    Apr. 4, 2024

Related U.S. Application Data

(63) Continuation of application No. 17/852,430, filed on Jun. 29, 2022, now abandoned, which is a
(Continued)

(51) Int. Cl.
*B65G 1/137* (2006.01)
*B65G 1/04* (2006.01)

(52) U.S. Cl.
CPC ............ *B65G 1/1373* (2013.01); *B65G 1/04* (2013.01); *B65G 1/0421* (2013.01); *B65G 1/0492* (2013.01); *B65G 1/137* (2013.01)

(58) Field of Classification Search
CPC ...... B65G 1/1373; B65G 1/04; B65G 1/0421; B65G 1/0492; B65G 1/137
See application file for complete search history.

(56) References Cited

U.S. PATENT DOCUMENTS 2,612,238 A    9/1952   Achilles
3,583,584 A    6/1971   Iacco
(Continued)

FOREIGN PATENT DOCUMENTS

EP    1348646    10/2003
JP    S49102080    9/1974
(Continued)

OTHER PUBLICATIONS

Examination Report issued in Australia for Application No. 2020201757 on Apr. 12, 2021.
(Continued)

*Primary Examiner* — Kyle O Logan
(74) *Attorney, Agent, or Firm* — Brian Dinicola

(57) ABSTRACT

A method and apparatus are provided for sorting or retrieving items to/from a plurality of destinations areas. The items are loaded onto one of a plurality of independently controlled delivery vehicles. The delivery vehicles follow a track that guides the delivery vehicles to/from the destination areas, which are positioned along the track. Once at the appropriate destination area, an item is transferred between the delivery vehicle and the destination area.

19 Claims, 15 Drawing Sheets

Related U.S. Application Data continuation of application No. 17/532,649, filed on Nov. 22, 2021, now Pat. No. 11,820,597, which is a continuation of application No. 16/904,352, filed on Jun. 17, 2020, now Pat. No. 11,214,438, which is a continuation of application No. 16/058,578, filed on Aug. 8, 2018, now Pat. No. 10,703,566, which is a continuation of application No. 15/700,663, filed on Sep. 11, 2017, now Pat. No. 10,071,857, which is a continuation of application No. 15/096,433, filed on Apr. 12, 2016, now Pat. No. 9,815,625, which is a continuation of application No. 13/859,598, filed on Apr. 9, 2013, now Pat. No. 9,334,116.

(60) Provisional application No. 61/622,000, filed on Apr. 9, 2012.

(56) References Cited

U.S. PATENT DOCUMENTS

| | | |
|---|---|---|
| 3,796,327 A | 3/1974 | Meyer et al. |
| 3,800,963 A | 4/1974 | Holland |
| 3,811,579 A | 5/1974 | Black |
| 4,053,741 A | 10/1977 | Ainoya et al. |
| 4,310,276 A | 1/1982 | Castagnoli |
| 4,509,635 A | 4/1985 | Emsley et al. |
| 4,554,873 A | 11/1985 | Rex |
| 4,812,102 A * | 3/1989 | Smith .................. B65G 1/0435 414/280 |
| 4,854,439 A | 8/1989 | Ueda |
| 4,963,251 A | 10/1990 | Bohm et al. |
| 5,012,749 A | 5/1991 | Passage, Jr. |
| 5,096,354 A | 3/1992 | Wu |
| 5,165,504 A | 11/1992 | Leccore |
| 5,218,909 A * | 6/1993 | Ng .................. A63H 18/08 238/10 F |
| 5,379,229 A | 1/1995 | Parsons et al. |
| 5,676,514 A | 10/1997 | Higman et al. |
| 5,842,555 A | 12/1998 | Gannon et al. |
| 5,928,058 A * | 7/1999 | Francis .................. A63H 17/36 446/457 |
| 5,990,437 A | 11/1999 | Coutant et al. |
| 6,098,550 A | 8/2000 | Tsuboi |
| 6,149,366 A | 11/2000 | Deandrea |
| 6,246,023 B1 | 6/2001 | Kugle |
| 6,262,863 B1 | 7/2001 | Ostwald et al. |
| 6,409,451 B1 * | 6/2002 | Fallin .................. B65G 47/82 198/433 |
| 6,652,213 B1 | 11/2003 | Mitchell et al. |
| 6,654,662 B1 | 11/2003 | Hognaland |
| 6,671,580 B2 | 12/2003 | Campbell et al. |
| 6,762,382 B1 | 7/2004 | Danelski |
| 6,805,526 B2 | 10/2004 | Stefani |
| 7,097,095 B2 | 8/2006 | Conard et al. |
| 7,101,139 B1 | 9/2006 | Benedict |
| 7,138,596 B2 | 11/2006 | Pippin et al. |
| 7,381,022 B1 | 6/2008 | King |
| 7,591,630 B2 | 9/2009 | Lert, Jr. |
| 7,861,844 B2 | 1/2011 | Hayduchok et al. |
| 7,943,431 B2 | 4/2011 | Benedict |
| 8,104,601 B2 | 1/2012 | Hayduchok et al. |
| 8,276,740 B2 | 10/2012 | Hayduchok et al. |
| 8,425,173 B2 | 4/2013 | Lert |
| 8,594,835 B2 | 11/2013 | Lert et al. |
| 8,622,194 B2 | 1/2014 | DeWitt et al. |
| 8,965,619 B2 | 2/2015 | Sullivan |
| 9,010,517 B2 | 4/2015 | Hayduchok et al. |
| 9,037,286 B2 | 5/2015 | Lert |
| 9,334,116 B2 | 5/2016 | De Witt et al. |
| 9,561,905 B2 | 2/2017 | Toebes |
| 9,815,625 B2 | 11/2017 | De Witt et al. |
| 10,071,857 B2 | 9/2018 | DeWitt et al. |
| 10,703,566 B2 | 7/2020 | De Witt et al. |
| 11,214,438 B2 | 1/2022 | De Witt et al. |
| 2003/0185657 A1 | 10/2003 | Stefani |
| 2006/0285948 A1 | 12/2006 | Tsujimoto et al. |
| 2007/0237610 A1 | 10/2007 | Uribe |
| 2008/0131241 A1 | 6/2008 | King |
| 2008/0277243 A1 * | 11/2008 | Hayduchok ............ B65G 1/065 198/463.6 |
| 2009/0074545 A1 * | 3/2009 | Lert, Jr. ............... B65G 1/1378 414/267 |
| 2009/0129902 A1 | 5/2009 | Schafer |
| 2010/0189534 A1 | 7/2010 | Jung |
| 2011/0081222 A1 | 4/2011 | Lin |
| 2011/0094854 A1 * | 4/2011 | Hayduchok ............ B65G 67/02 198/370.1 |

FOREIGN PATENT DOCUMENTS

| | | |
|---|---|---|
| JP | S5340982 | 4/1978 |
| JP | 54047283 | 4/1979 |
| JP | 59116306 | 8/1984 |
| JP | 2019142721 | 8/2019 |
| WO | 2007116643 | 10/2007 |
| WO | 2010049987 | 5/2010 |

OTHER PUBLICATIONS

Examination Report issued in India for Application No. 9058/DELNP/2014 on Aug. 12, 2021.

Examination Report issued in Australia for Application 2013246038 on Nov. 25, 2016.

"On Sequencing Retrievals In An Automated Storage/Retrieval System" from IIE Transactions, by Min-Hong Han et al., vol. 19, No. 1, pp. 56-66, Oct. 6, 1984.

"Automated Storage and Retrieval Systems: A Review on Travel Time Models and Control Policies" In: "Warehousing in the Global Supply Chain" by M.R. Vasili et al., Jan. 1, 2012.

Examination Report issued in Canada for Application No. 3,085,570 on Jun. 2, 2022.

Examination Report issued in Australia for Application No. 2013246038 on Jul. 14, 2017.

Examination Report issued in Europe for Application No. 13775199.6 on Nov. 7, 2019.

Examination Report issued in Europe for Application No. 13775199.6 on Mar. 20, 2017.

Examination Report issued in Japan for Application No. 2015-505857 on Mar. 7, 2017.

Examination Report issued in Japan for Application No. 2019-077197 on Jun. 30, 2020.

Exam Report issued in Japan for Application No. 2021164323 on Dec. 22, 2022.

Extended Search Report issued in Europe for Application No. 23155409.8 on Jun. 27, 2023.

Extended Search Report issued in Europe for Application No. 23157738.8 on Jul. 3, 2023.

Examination Report issued in Canada for Application No. 3, 171,548 on Nov. 24, 2023.

* cited by examiner

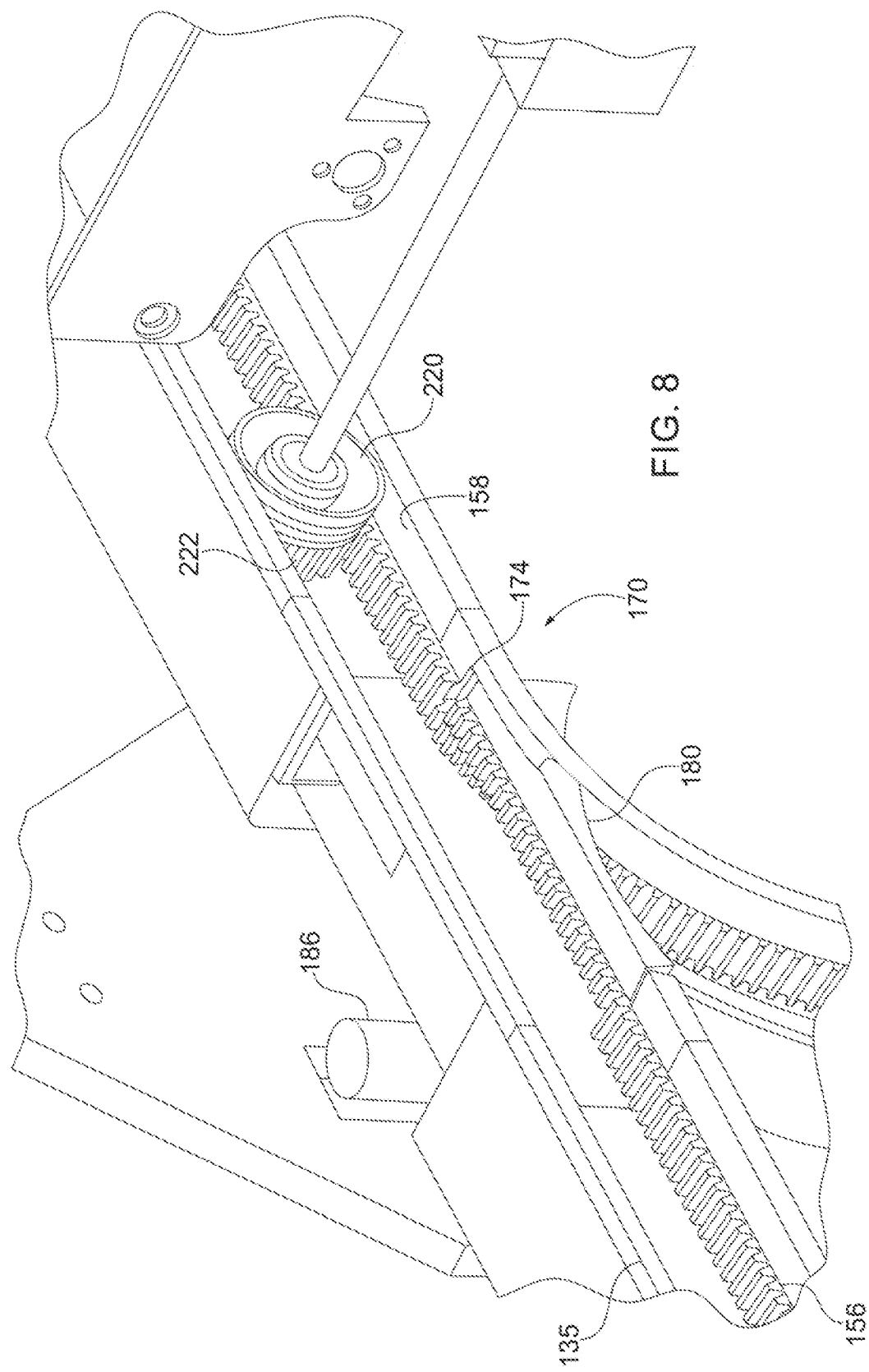

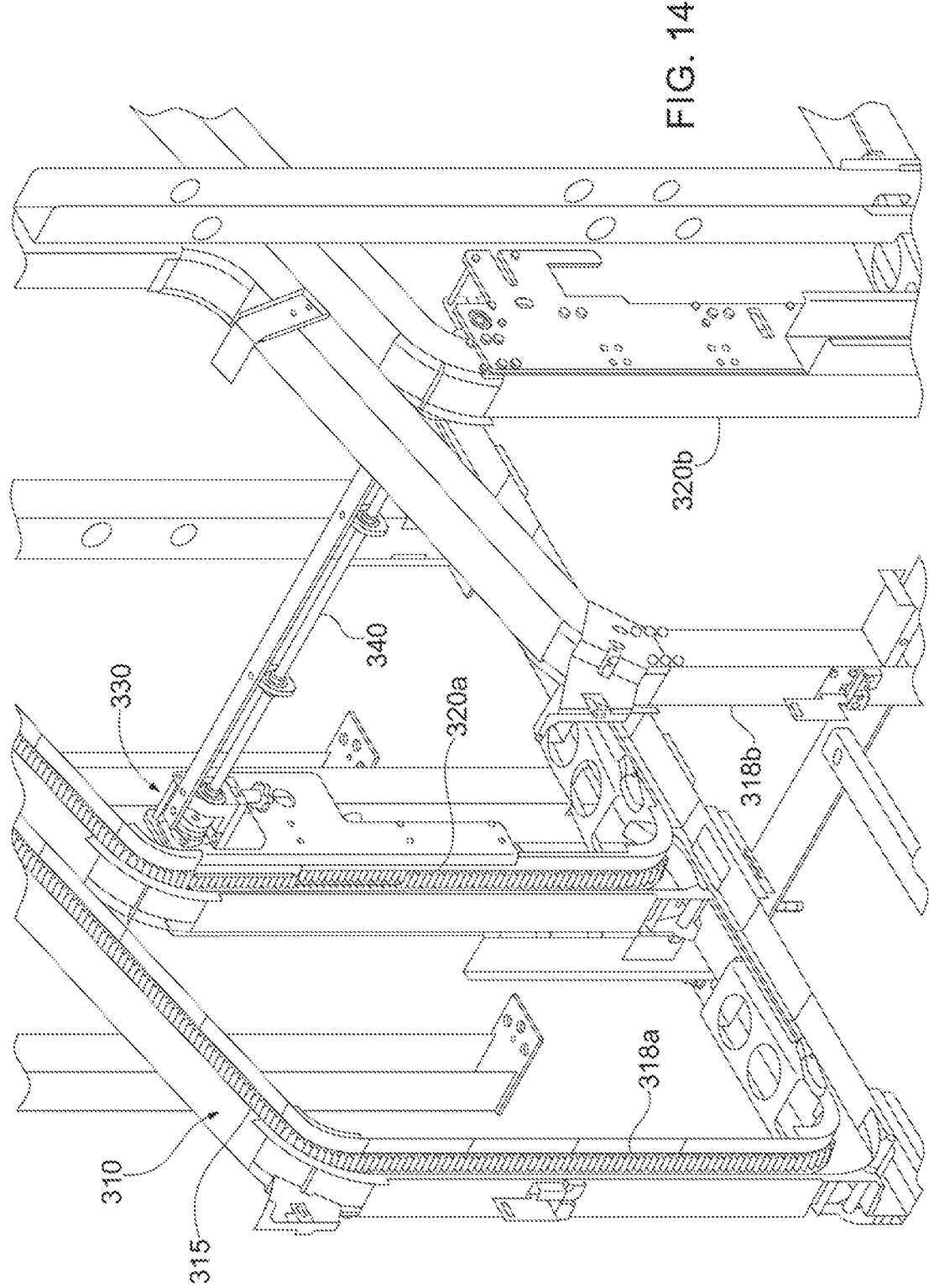

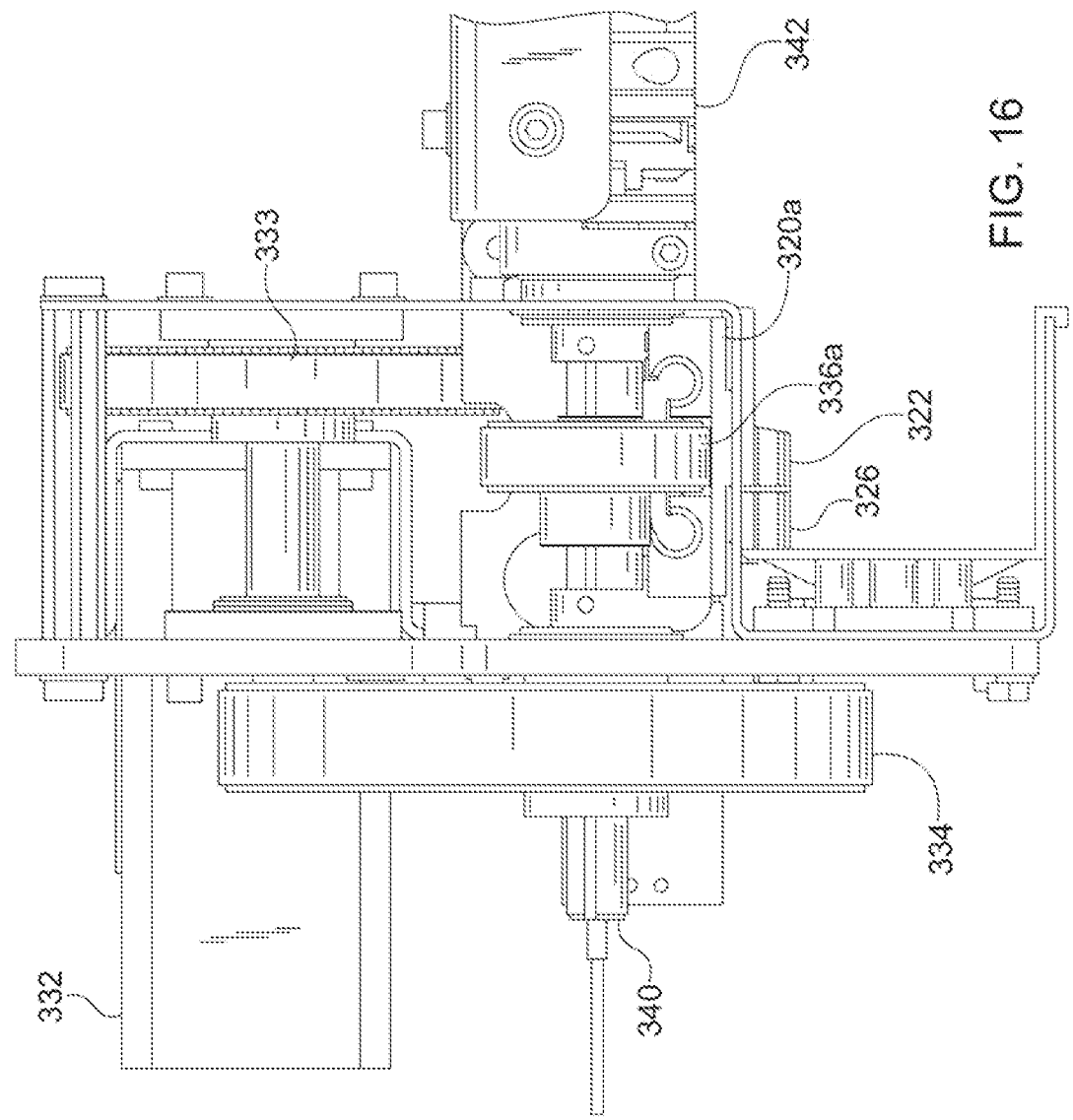

METHOD AND APPARATUS FOR SORTING OR RETRIEVING ITEMS

PRIORITY CLAIM

This application is a continuation of pending U.S. patent application Ser. No. 17/852,430 filed on Jun. 29, 2022, which is a continuation of U.S. patent application Ser. No. 17/532,649, filed on Nov. 22, 2021, which is a continuation of U.S. patent application Ser. No. 16/904,352, filed on Jun. 17, 2020, which is a continuation of U.S. patent application Ser. No. 16/058,578, filed Aug. 8, 2018, which is a continuation of U.S. patent application Ser. No. 15/700,663, filed Sep. 11, 2017, which is a continuation of U.S. patent application Ser. No. 15/096,433, filed Apr. 12, 2016, which is a continuation of U.S. patent application Ser. No. 13/859,598, filed Apr. 9, 2013, which claims priority to U.S. Provisional Patent Application No. 61/622,000 filed Apr. 9, 2012. The entire disclosure of each of the foregoing applications is hereby incorporated herein by reference.

FIELD OF THE INVENTION

The present invention relates to a material handling system for sorting or retrieving items. More specifically, the present invention relates to a material handling system incorporating a plurality of destination areas arranged along a track for guiding a plurality of vehicles for carrying items to and/or from the destination areas.

BACKGROUND OF THE INVENTION

Sorting and retrieving items to fill a customer order can be a laborious and time consuming. Similarly, may large organizations have extensive storage areas in which numerous items are stored. Sorting and retrieving items from the hundreds or thousands of storage areas requires significant labor to perform manually. In many fields, automated picking has developed to reduce labor cost and improve customer service by reducing the time it takes to fill a customer order. However, the known systems of automatically handling the materials are either very expensive or have limitations that hamper their effectiveness. Accordingly, there is a need in a variety of material handling applications for automatically storing and/or retrieving items.

SUMMARY OF THE INVENTION

In light of the foregoing, a system provides a method and apparatus for handling items. The system includes a plurality of storage locations, and a plurality of delivery vehicles for delivering items to or retrieving items from the storage locations. A track guides the delivery vehicles to the storage locations.

According to one aspect, the present invention provides a material handling system that includes a plurality of storage locations, a track, a plurality of vehicles, an output station and a controller. The track is adjacent the storage locations and a first group of the storage locations may be disposed on a first side of the track and a second group of the storage locations may be disposed on a second side of the track. The vehicles are configured to deliver items to the storage locations or retrieving items from the storage locations. The vehicles travel along the track in an aisle between the first and second groups of storage locations. The controller independently controls each vehicle and may be configured to control one of the vehicles to retrieve an from one of the storage locations and then advance the vehicle with the item toward the output station, wherein when the vehicle approaches the output station, the controller may be configured to control the vehicle so that the vehicle drives upwardly and stops at the output station to present the contents to the operator so that the operator can readily remove the item from the vehicle. The controller may also be configured to advance the vehicle away from the output station after the operator removes the item from the vehicle.

According to another aspect, the present invention provides a material handling system having a plurality of storage locations, a track, a plurality of vehicles and an output station. The track may be adjacent the storage locations and may include a plurality of generally vertical rail sections forming a row of columns and a plurality of generally horizontal rail sections interconnecting the columns forming a vertical loop. The vehicles are configured to travel along the track around the vertical loop to deliver items to the storage locations or retrieve items from the storage locations. The output station may be positioned along the track at an end of the row of columns and it may be configured so that an operator can readily remove items from the vehicles when the vehicles stop at the output station.

According to yet another aspect, the present invention provides a controller that controls the operation of the delivery vehicles based on information determined for each item to be sorted. Additionally, the track may include a plurality of interconnected vertical and horizontal sections so that the vehicles may travel along a continuous path changing from a horizontal direction to a vertical direction. Further, the vehicles may be driven such that the orientation of an item on the vehicle stays constant as the vehicles changes from a horizontal direction of travel to a vertical direction of travel.

According to another aspect, the invention provides a method for retrieving items from a plurality of storage locations arranged along a track. A delivery vehicle is driven along the track to retrieve an item from one of the storage locations. The delivery vehicle is stopped along the track and a portion of the track is displaced while the delivery vehicle is stopped along the track, thereby tilting the delivery vehicle to present the item to an operator.

According to yet another aspect, the invention provides a material handling system, comprising a plurality of storage locations for receiving items. A track is positioned adjacent the storage locations and a plurality of cars drive along the track to retrieve items from the storage locations. An output location along the track is provided so that an operator can retrieve an item being conveyed by one of the cars. At the output location, the track comprises a moveable section so that displacing the moveable section while one of the cars is stopped at the output location is operable to tilt the car.

In another embodiment, a material handling system having a plurality of storage locations arranged into a series of rows or columns and a track adjacent the storage locations. The track comprises a plurality of rows or columns and a plurality of vehicles are provided for delivering items to the storage locations or retrieving items from the storage locations, wherein each vehicle comprises an onboard motor for driving the vehicle along the track to or from one of the storage locations. A controller for independently controlling each vehicle is provided, wherein the controller controls a plurality of the vehicles to retrieve a plurality of items from the storage locations for an order by estimating the retrieval time for each item in an order, wherein the retrieval time is the time required for each item in the order to be retrieved by a separate vehicle and calculating the sequence in which vehicles are assigned to retrieve items for the order based on the estimates of the retrieval time for each item in the order. Wherein the controller directs the plurality of vehicles to the corresponding storage locations in response to calculating the sequence in which vehicle are assigned to retrieve items for the order.

According to yet another aspect, the present invention provides a material handling system for delivering a plurality of items to or from a plurality of destination areas. The system may include a plurality of delivery vehicles for delivering the items to the destination areas and a track for guiding the delivery vehicles, wherein the track comprises a substantially vertical portion and a horizontal portion and a gate providing a continuous path from a horizontal to a vertical direction. The system may be configured so that each of the vehicles include a transfer mechanism and a drive element operable to drive the transfer mechanism. Each vehicle may also include a gate actuator operable between a first position in which the actuator does not actuate the gate and a second position in which the actuator is operable to actuate the gate, wherein actuating the drive element of the transfer mechanism actuates the gate actuator from the first position to the second position.

Further still, another aspect of the present invention provides a delivery vehicle operable with a material handling system having a plurality of destination areas and a guide system having a gate actuable between a first position and a second position. The delivery vehicle includes a motor for driving the vehicle to one of the destination areas and a drive system cooperable with the guide system to guide the vehicle to one of the destination areas. The vehicle may further include a transfer mechanism operable to transfer an item between the vehicle and one of the destination areas and a drive element operable to drive the transfer mechanism. The vehicle further may include a gate actuator operable between a first position in which the actuator does not actuate the gate and a second position in which the actuator is operable to actuate the gate, wherein actuating the drive element of the transfer mechanism actuates the gate actuator from the first position to the second position.

BRIEF DESCRIPTION OF THE DRAWINGS

The foregoing summary and the following detailed description of the preferred embodiments of the present invention will be best understood when read in conjunction with the appended drawings, in which:

FIG. 8 is an enlarged fragmentary perspective view of a portion of the track of the system illustrated in FIG. 1, showing details of a gate in the closed position;

FIG. 14 is an enlarged perspective partially broken away of a picking station of the apparatus illustrated in FIG. 1;

FIG. 16 is an enlarged fragmentary plan view of a portion of the picking station illustrated in FIG. 14.

DETAILED DESCRIPTION OF THE INVENTION

Figure 1:
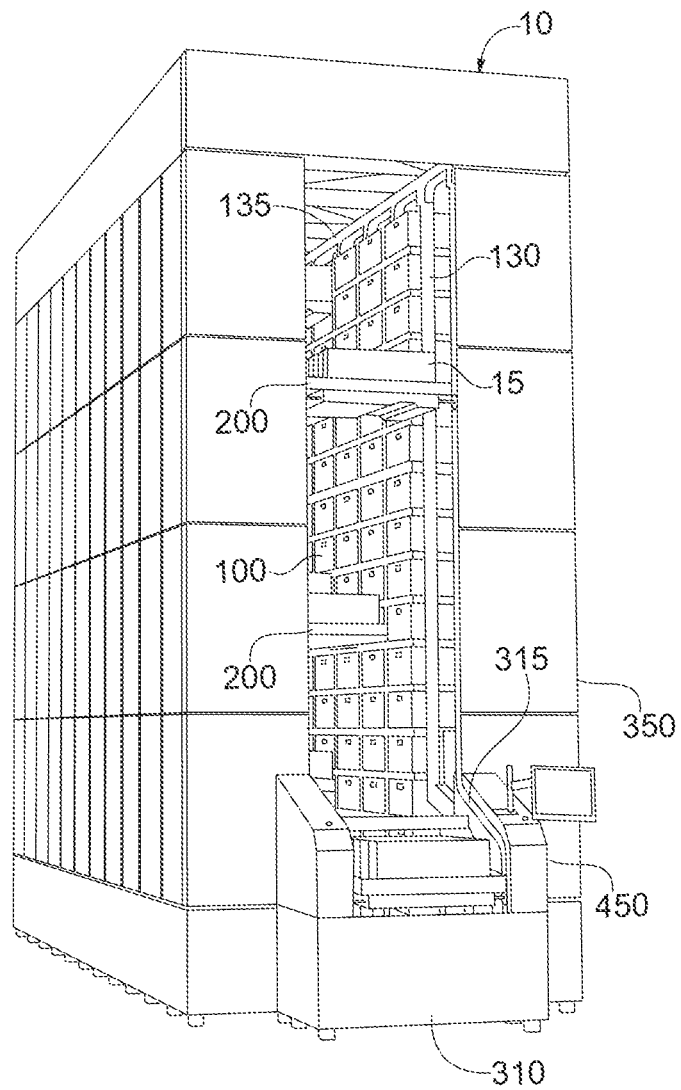
FIG. 1 is a perspective view of a sorting and retrieving apparatus.

Referring now to the figures in general and to FIG. 1 specifically, an apparatus for sorting or retrieving items is designated generally 10. The apparatus 10 includes a plurality of delivery vehicles or cars 200 to retrieve items from one of a plurality of locations, such as storage areas 100. The cars then deliver the items to an output station 310 where an operator can retrieve the item from the car. The car then returns to a storage area to store any remaining items that were not retrieved by the operator. The car then advances to another storage area to obtain the next item to be retrieved. In this way, the system includes a plurality of individually controlled cars 200 that flow through the track to retrieve items from the various storage areas and present the items to an operator before returning any remaining items and then retrieving another item.

Figure 2:
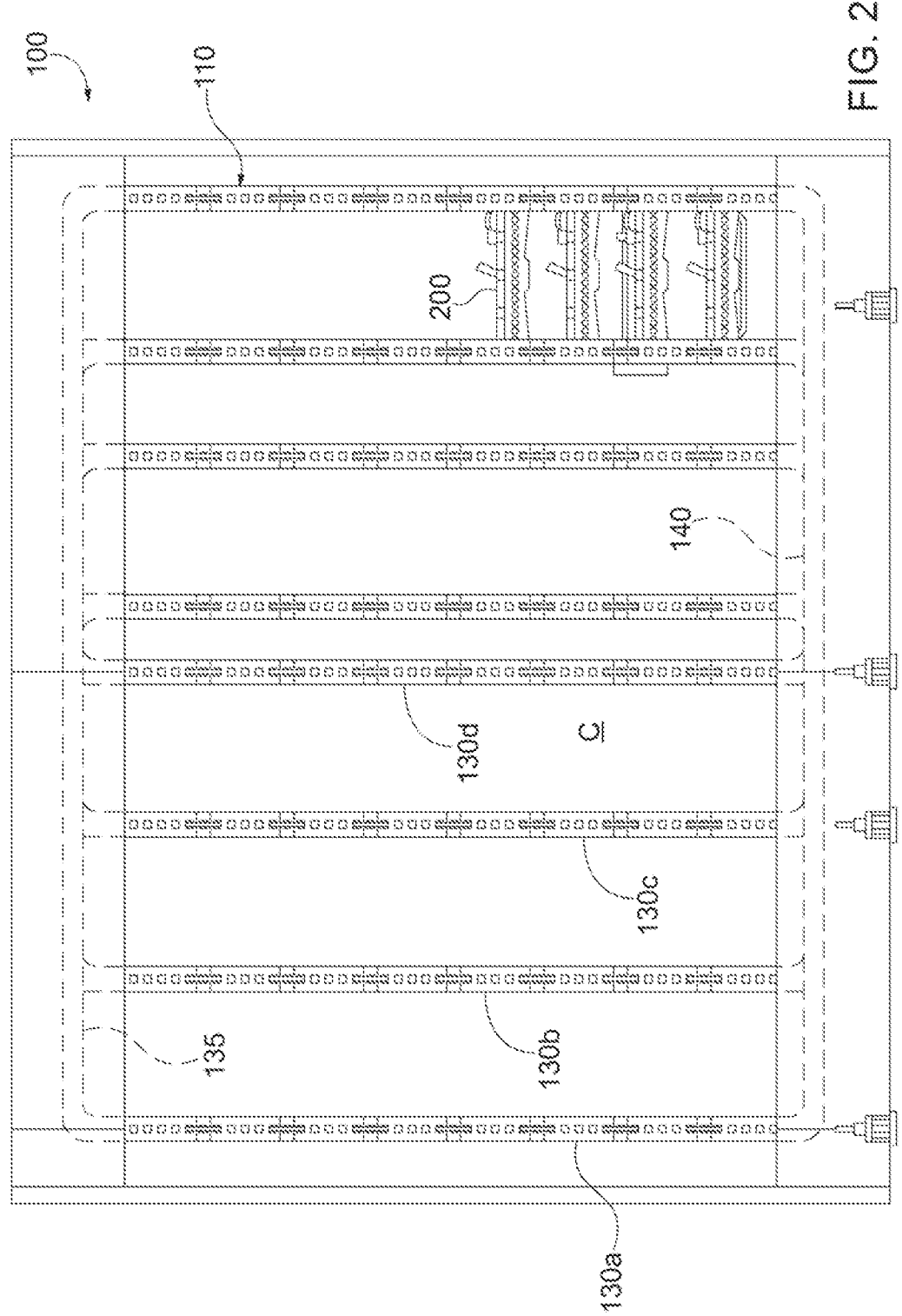
FIG. 2 is a fragmentary front view, illustrating a portion of the track system of the apparatus illustrated in FIG. 1.
Figure 3:
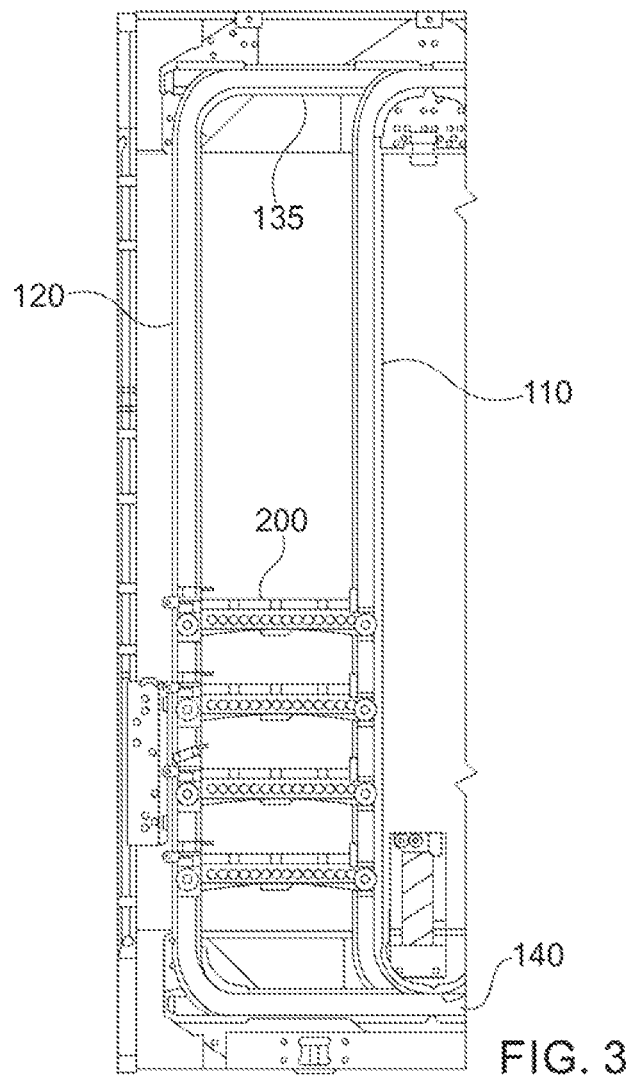
FIG. 3 is a fragmentary sectional view of a portion of the apparatus illustrated in FIG. 1.

The cars 200 travel along a track 110 to the storage locations. The track has a horizontal upper rail 135 and a horizontal lower rail 140, which operates as a return leg. A number of parallel vertical track legs 130 extend between the upper rail and the lower return leg. In the present instance, the storage areas 100 are arranged in columns between the vertical track legs 130. In FIGS. 2-3, the track system is illustrated as a generally rectilinear array of columns. However, as shown in FIGS. 14-17, the output station 310, comprises a pick station that has a curved track 315 that curves outwardly from the array of bins so that totes carried by the cars are readily accessible to the operator.

In a typical operation using the system, after the vehicle leaves the picking station 310, the vehicle will be carrying an item that is to be returned to one of the storage areas 100. The vehicle will return the item to a first storage area and then move to a second storage area to retrieve a second item to be transported to the picking station.

After leaving the picking station, the car travels upwardly along two pairs of vertical tracks legs and then horizontally along two upper tracks 135. The car 200 travels along the upper rail until it reaches the appropriate column containing the storage area for the item that the car is carrying. The track 110 includes gates 180 that direct the car 200 down the vertical legs and the car stops at the appropriate storage area. The car 200 then discharges the item into the storage area.

After discharging the item, the car 200 travels to the second storage location to retrieve the next item to be transported to the picking station. After retrieving the item, the car 200 travels down the vertical legs 130 of the column until it reaches the lower rail 140. Gates direct the car along the lower rail, and the car follows the lower rail to return to the pick station 310 to deliver another item.

The cars 200 are semi-autonomous vehicles that each have an onboard power source and an onboard motor to drive the cars along the track 110. The cars also include a loading/unloading mechanism 210, for loading items onto the cars and discharging items from the cars.

Since the system 10 includes a number of cars 200, the positioning of the cars is controlled to ensure that the different cars do not crash into each other. In one embodiment, the system 10 uses a central controller 450 that tracks the position of each car 200 and provides control signals to each car to control the progress of the cars along the track. The central controller 450 may also control operation of the various elements along the track, such as the gates 180. However, in the present instance, the gates are actuated by the cars 200 as discussed further below.

Referring to FIG. 1, the system includes an array of storage locations 100 for receiving items. In the present instance, the storage locations 190 are arranged in columns. Additionally, the system 10 includes a track 110 for guiding the cars 200 to the storage locations 100. In the following description, the system is described as delivering and/or retrieving items to and from storage areas 100. The items may be configured so that an individual item is stored at a storage location. However, in a typical operation environment, the items are stored in or on a storage mechanism, such as a container or platform. For instance, in the present instance, the items are stored in a container, referred to as a tote. The tote is similar to a carton or box without a lid, so that an operator can easily reach into the tote to retrieve an item at the picking station. Although the present system is described as using totes, it should be understood that any of a variety of storage mechanisms can be used, such as pallets or similar platforms.

The storage locations 100 can be any of a variety of configurations. For instance, the simplest configuration is a shelf for supporting the items or the container holding the items. Similarly, the storage locations 190 may include one or more brackets that cooperate with the storage mechanism to support the storage mechanism in the storage location. For example, in the present instance, the storage locations include brackets similar to shelf brackets for supporting one of the totes.

Referring to FIG. 1, the system 10 generally includes a plurality of storage locations 100, which in the present instance are arranged in an array. At least one output station 310, referred to as a pick station, is disposed adjacent the storage locations. The cars 200 retrieve totes 15 from the storage locations 100 and deliver the totes to the pick station 310 where an operator can retrieve one or more items from the totes. After the operator retrieves the items, the car 200 advances the tote 15 away from the picking station 310 and returns to one of the storage locations.

The storage locations are arranged along a track 110. In the present instance, the track 110 includes a horizontal upper rail 135 and a horizontal lower rail 140. A plurality of vertical legs 130 extend between the upper horizontal leg and the lower horizontal leg 140. During transport, the cars travel up a pair of vertical legs from the pick station 310 to the upper rail 135 (as described below, the cars actually travel up two pairs of rails because the track includes a forward track and a parallel opposing track). The car then travels along the upper rail until reaching the column having the appropriate storage area. The car then travels downwardly along two front vertical posts and two parallel rear posts until reaching the appropriate storage location, and then discharges the item into the storage location. The car then travels to another storage location to retrieve another item. After retrieving the item, the car travels down the vertical legs until reaching the lower horizontal leg 140. The car then follows the lower rail back toward the pick station 310.

Figure 11:
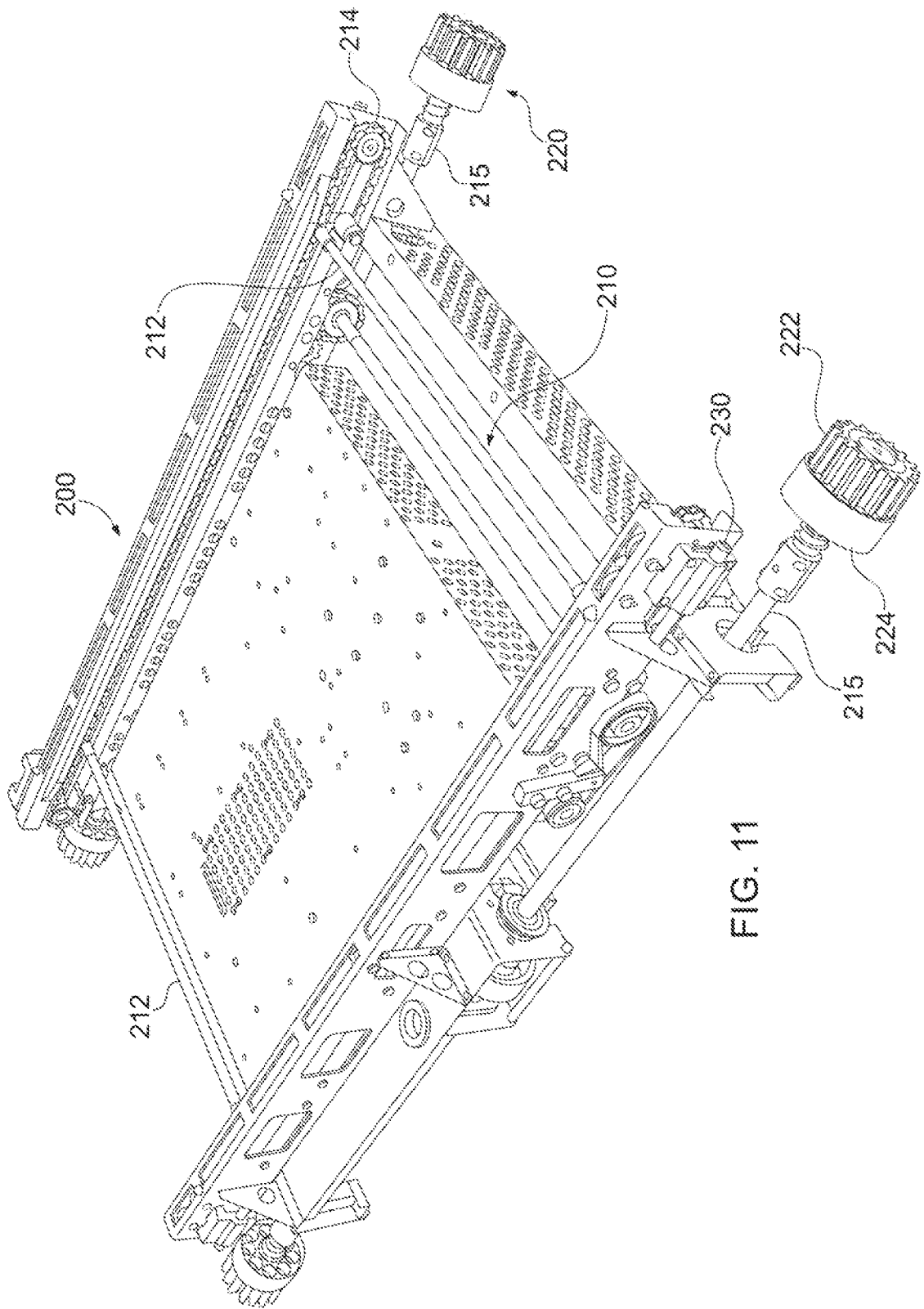
FIG. 11 is a top perspective view of a delivery vehicle of the apparatus illustrated in FIG. 1.

As can be seen in FIGS. 1-3, the track 110 includes a front track 115 and a rear track 120. The front and rear tracks 115, 120 are parallel tracks that cooperate to guide the cars around the track. As shown in FIG. 11, each of the cars includes four wheels 220: two forward wheel and two rearward wheels. The forward wheels 220 ride in the front track, while the rearward wheel ride in the rear track. It should be understood that in the discussion of the track the front and rear tracks 115, 120 are similarly configured opposing tracks that support the forward and rearward wheels 220 of the cars. Accordingly, a description of a portion of either the front or rear track also applies to the opposing front or rear track.

Figure 9:
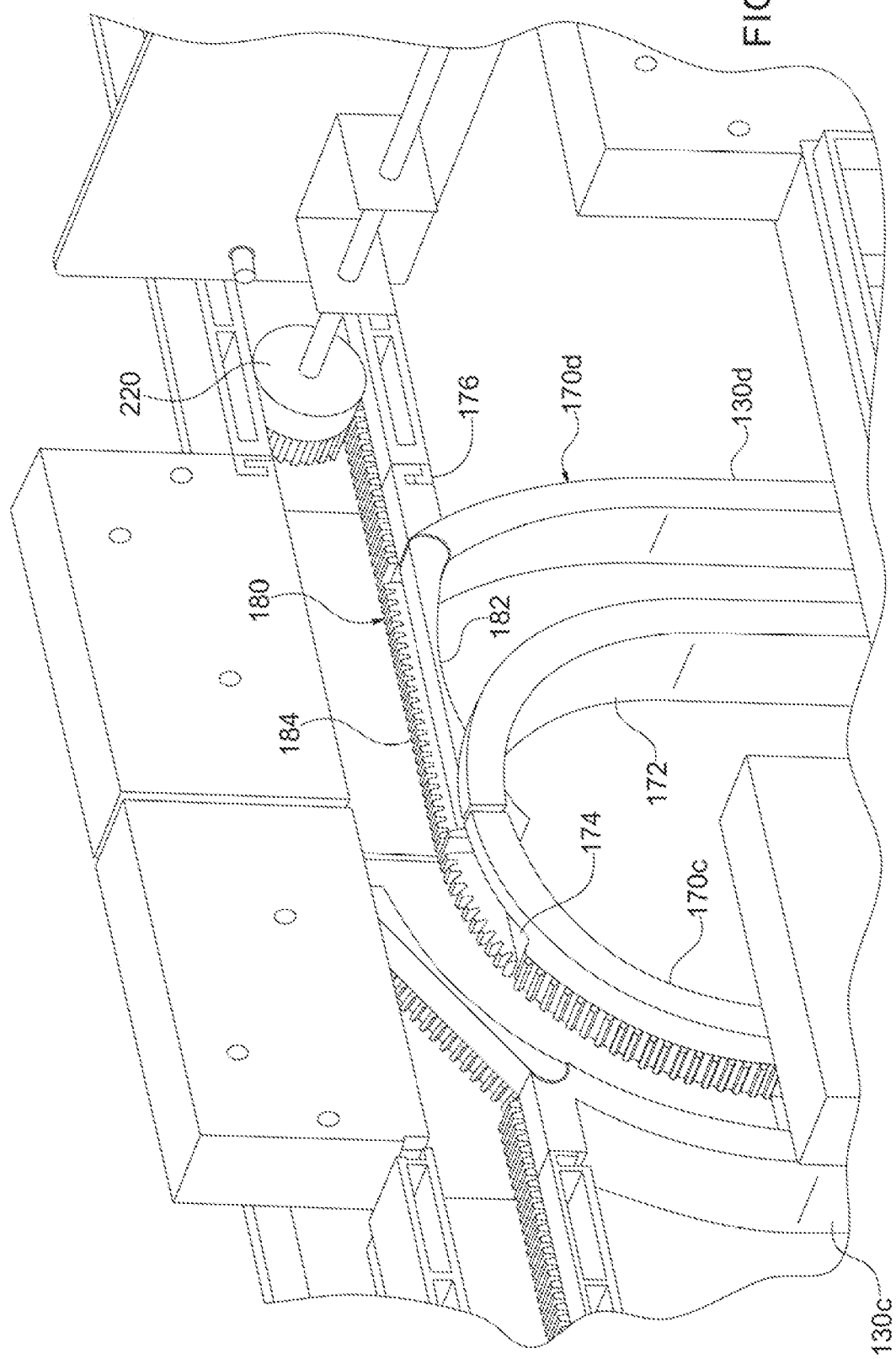
FIG. 9 is an enlarged fragmentary perspective view of a portion of the track of the system illustrated in FIG. 1, showing details of a gate in the open position.
Figure 10:
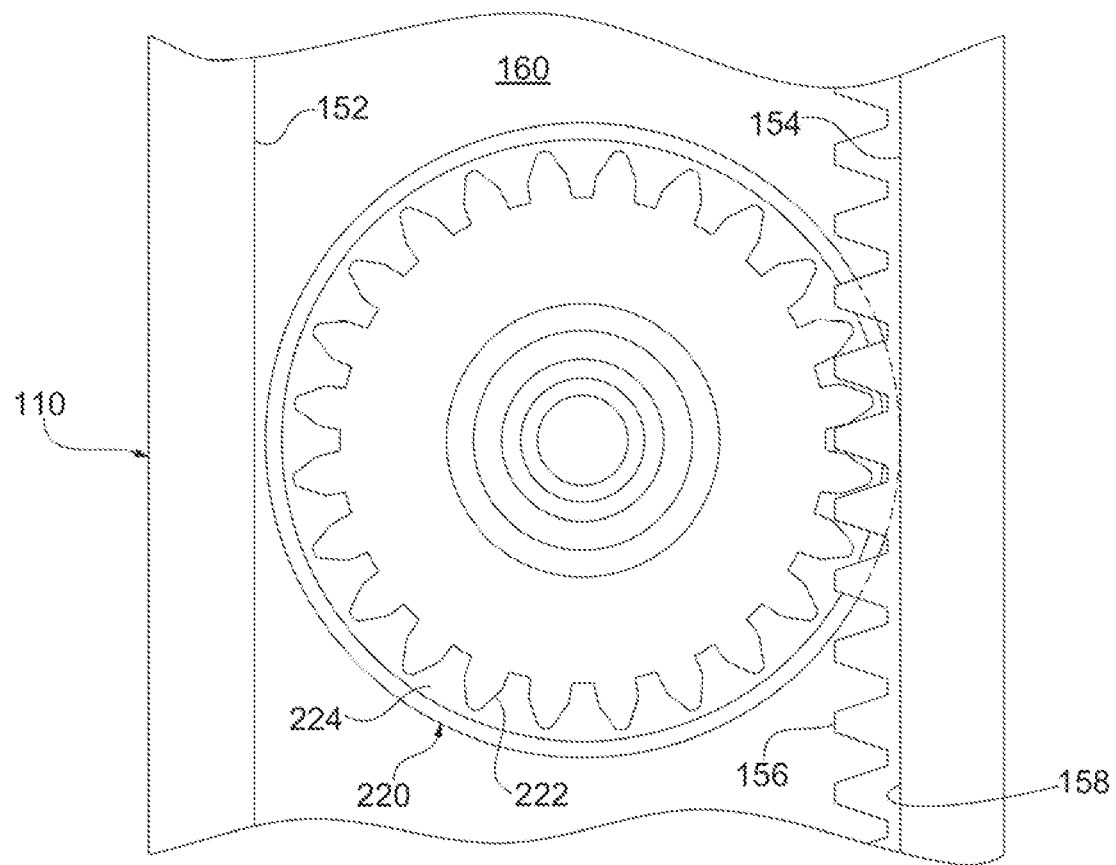
FIG. 10 is an enlarged view of a wheel of the delivery vehicle illustrated in FIG. 8, shown in relation to the track of the apparatus illustrated in FIG. 1.

Referring to FIGS. 1-10, the details of the track will be described in greater detail. The track 110 includes an outer wall 152 and an inner wall 154 that is spaced apart from the outer wall and parallel to the outer wall. The track also has a back wall 160 extending between the inner and outer walls. As can be seen in FIGS. 8-10, the outer and inner walls 152, 154 and the back wall form a channel. The wheels 220 of the car ride in this channel.

Referring to FIGS. 8-10, the track includes both a drive surface 156 and a guide surface 158. The drive surface 156 positively engages the cars to enable the car to travel along the track. The guide surface 158 guides the car, maintaining the car in operative engagement with the drive surface 156. In the present instance, the drive surface is formed of a series of teeth, forming a rack that engages the wheels of the cars as described further below. The guide surface 158 is a generally flat surface adjacent the rack 156. The rack 156 extends approximately halfway across the track and the guide surface 158 extends across the other half of the track. As shown in FIGS. 8 and 9, the rack 156 is formed on the inner wall 154 of the track. The opposing outer wall 152 is a generally flat surface parallel to the guide surface 158 of the inner wall.

As described above, the track includes a plurality of vertical legs extending between the horizontal upper and lower rails 135, 140. An intersection 170 is formed at each section of the track at which one of the vertical legs intersects one of the horizontal legs. Each intersection includes an inner branch 172 that is curved and an outer branch 176 that is generally straight. FIG. 9 illustrates both a right-hand intersection 170c and a left-hand intersection 170d, which are mirrors of one another. In FIG. 9, the intersections 170c, 170d illustrate the portion of the track in which two vertical legs 130 intersect the upper horizontal leg 135. The intersections of the vertical legs with the lower rail incorporate similar intersections, except the intersections are reversed. Specifically, the point at which vertical leg 130c intersects the lower rail incorporates an intersection configured similar to intersection 170*d*, and the point at which vertical leg 130*d* intersects the lower rail incorporates an intersection configured similar to intersection 170*c*.

Each intersection 170 includes a pivotable gate 180 that has a smooth curved inner race and a flat outer race that has teeth that correspond to the teeth of the drive surface 156 for the track. The gate 180 pivots between a first position and a second position. In the first position, the gate 180 is closed so that the straight outer race 184 of the gate is aligned with the straight outer branch 176 of the intersection. In the second position, the gate is open so that the curved inner race 182 of the gate is aligned with the curved branch 172 of the intersection.

Accordingly, in the closed position, the gate is pivoted downwardly so that the outer race 184 of the gate aligns with the drive surface 156. In this position, the gate blocks the car from turning down the curved portion, so that the car continues straight through the intersection. In contrast, as illustrated n FIG. 9, when the gate is pivoted into the open position, the gate blocks the car from going straight through the intersection. Instead, the curved inner race 182 of the gate aligns with the curved surface of the inner branch 172 and the car turns through the intersection. In other words, when the gate is closed, a car goes straight through the intersection along either the upper rail 130 or the lower rail, depending on the location of the intersection. When the gate is opened, the gate directs the car from either a vertical rail to a horizontal rail or from a horizontal rail to a vertical rail, depending on the location of the intersection.

As can be seen in FIG. 8, the end of the gate remote from the pivot point of the gate flares outwardly so that the curved inner race matches the curved profile of the inner branch when the gate is open. As a result, the gate has a generally L-shaped configuration. To accommodate the flared end of the gate 180, the drive surface 156 of the inner branch has a notch or recessed portion. When the gate is closed, the notch provides clearance so that the outer race 184 of the gate lies flat, parallel with the drive surface of the outer branch 176. Further, in the example shown in FIG. 9, the gate is positioned along the upper rail 135 of the track 110. When the gate is closed, the recess in the inner branch of the intersection 170 allows the gate to lie flat so that it is aligned with the drive surface of the upper rail.

In the foregoing description, the gates allow one of the cars to either continue in the same direction (e.g. horizontally) or turn in one direction (e.g. vertically). However, in some applications, the system may include more than two horizontal rails that intersect the vertical columns. In such a configuration, it may be desirable to include a different rail that allows the cars to turn in more than one direction. For instance, if a car is traveling down a column, the gate may allow the car to turn either left or right down a horizontal rail, or travel straight through along the vertical column. Additionally, in some instances, the cars may travel upwardly The gates 180 may be controlled by signals received from the central controller 450. Specifically, each gate may be connected with an actuator that displaces the gate from the opened position to the closed position and back. There may be any of a variety of controllable elements operable to displace the gate. For instance, the actuator may be a solenoid having a linearly displaceable piston.

Figure 4:
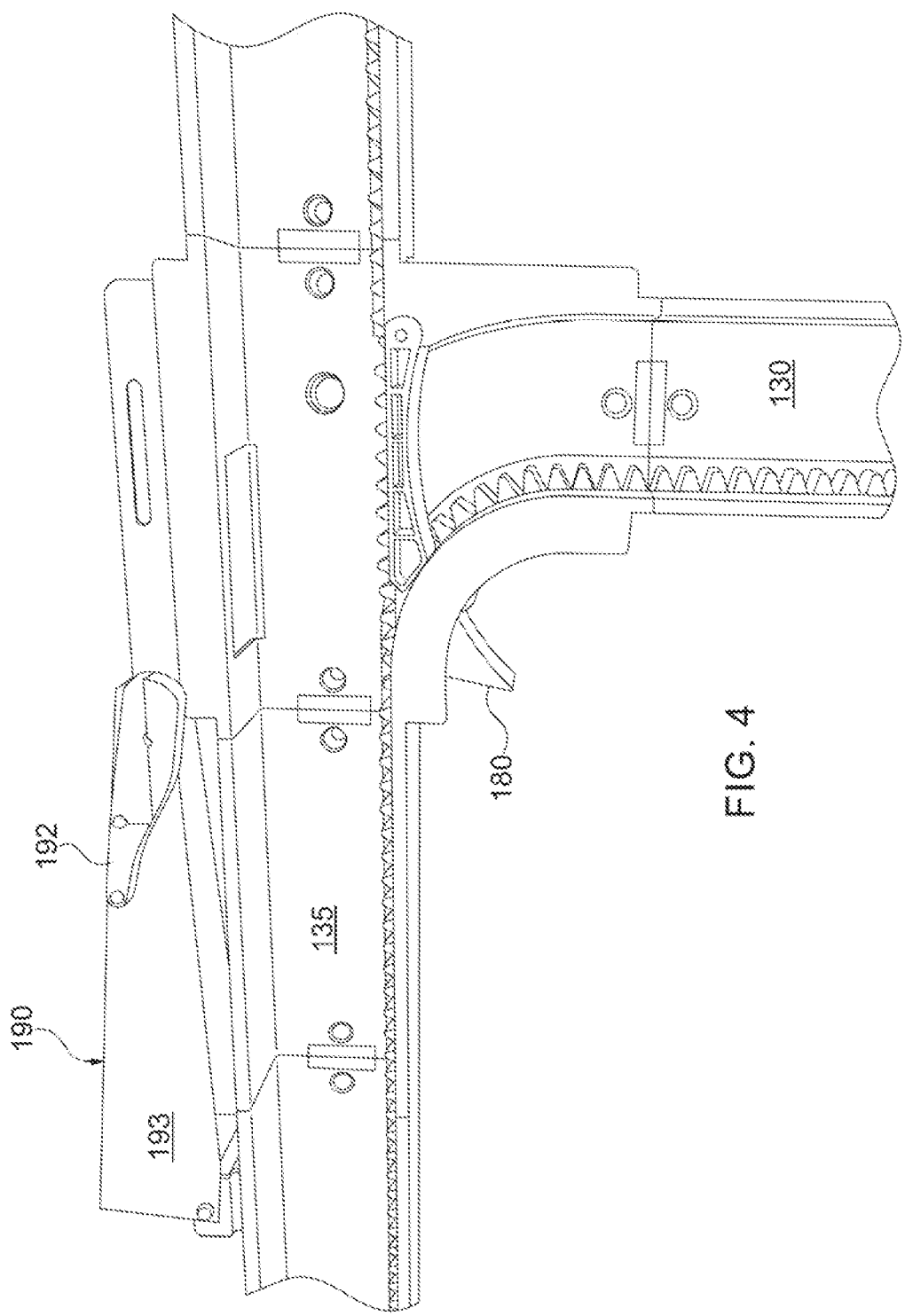
FIG. 4 is an enlarged fragmentary view of a portion of track of the apparatus illustrated in FIG. 1, showing details of a gate in an closed position.

Although the gates may be automatically actuated by an actuator along the track that is controlled by the central controller 450, in the present instance, the gates 180 are controlled by an actuator on the cars 200. Specifically, referring to FIGS. 4-7, the gates includes a passive actuator 190 that responds to an actuator 230 on the cars. If the actuator on the car engages the gate actuator 190 then the gate moves from a first position to a second position. For instance, as shown in FIG. 4, the gate is in a first position so that the vehicle will remain along the horizontal rail. If the gate actuator 230 on the car 200 engages the actuator 190 on the gate, the gate 180 will pivot upwardly into a second position so that the car will turn and move downwardly along the vertical rail 130.

In the present instance, the actuators 190 on the gates are moveable actuation surfaces 192 connected to the gate by a linkage 195. The actuation surface 192 is mounted on a pivotable arm 193. To actuate the gate and move it from the first position to the second position, the gate actuator 230 on the car contacts the actuation surface 192. The actuation surface is angled similar to a ramp, so that as the car advances toward the gate, the gate actuator on the car engages the actuation surface and progressively displaces the arm 193 upwardly. The arm 193 is connected to the gate 180 by a linkage 195. Accordingly, when the arm 193 pivots, the gate pivots as well. In this way, the actuator 230 on the car engages the actuator on the gate to move the gate from the first position to the second position.

After the car 200 passes through the gate, the gate may be configured to remain in the second position until actuated by the gate actuator on the car to return to the first position. However, in the present instance, after the car passes through the intersection 170, the gate 180 automatically returns to the first position. A variety of elements may be used to automatically displace the gate to the first position. For instance, a biasing element may bias the spring toward the first position. Alternatively, the gate actuator may be disposed so that the weight of the pivotable arm 193 and the actuation surface 192 tend to pivot the arm downwardly, thereby displacing the gate toward the first position.

Accordingly, the gate actuator 190 adjacent the track 110 operates in response to an actuator on the car. In this way, the gate actuator does not communicate with the central controller. Instead, the central controller communicates with the car to selectively actuate the gates 180 as discussed further below.

In the foregoing description, the system 10 is described as a plurality of storage areas 100. However, it should be understood that the system may include a variety of types of destinations, not simply storage locations. For instance, in certain applications, the destination may be an output device that conveys items to other locations. According to one example of an output device, the system may include one or more output conveyors that convey items away from the storage locations and toward a different material handling or processing system. For instance, an output conveyor designated A may convey items to a processing center designated A. Therefore, if an item is to be delivered to processing center A, the car will travel along the track to output conveyor A. Once the car reaches output conveyor A, the car will stop and transfer the item onto output conveyor A. Output conveyor A will then convey the item to processing center A. Further, it should be understood that the system may be configured to include a plurality of output devices, such as output conveyors.

In some embodiments, the system may include a plurality of output conveyors in addition to the storage locations. In other embodiments, the system may only include a plurality of output devices, such as conveyors, and the system is configured to sort the items to the various output devices.

Delivery Vehicles

Figure 13:
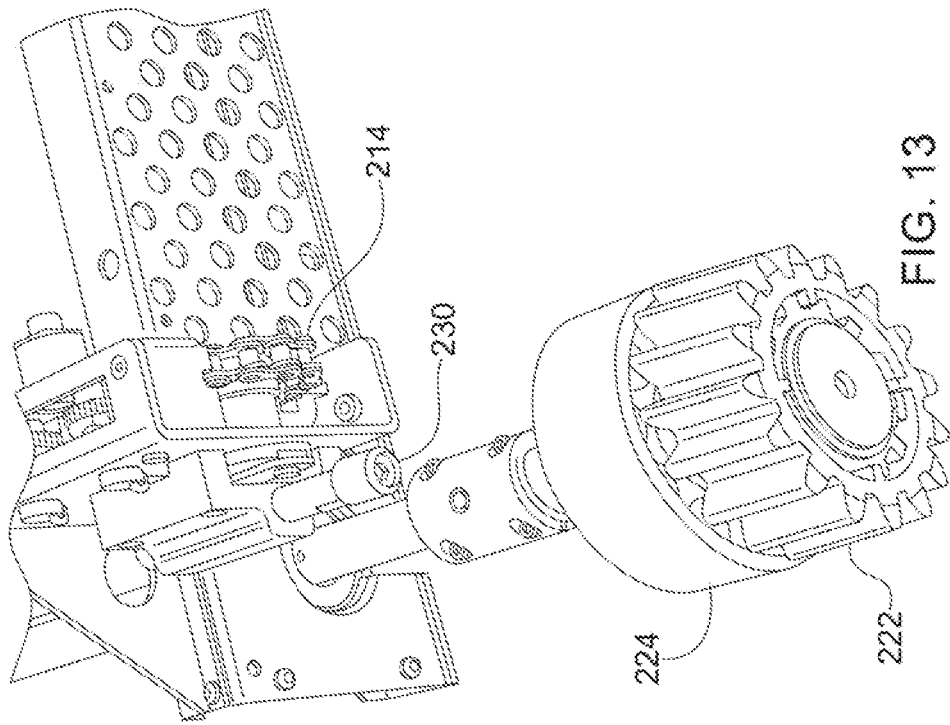
FIG. 13 is an enlarged perspective view of a portion of the delivery vehicle illustrated in FIG. 11.
Figure 12:
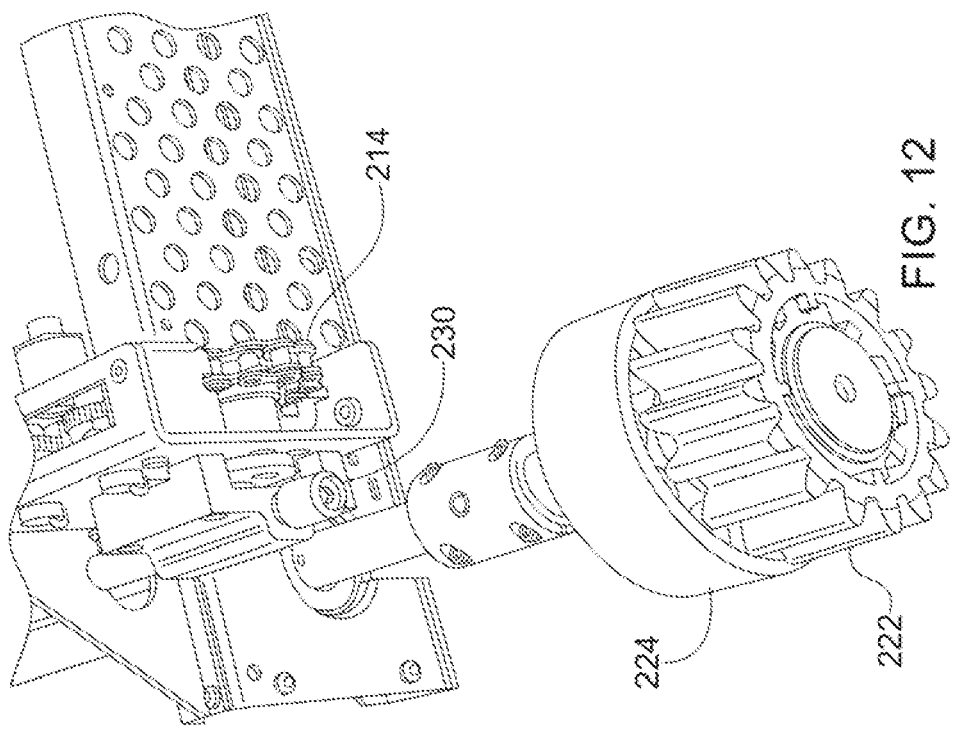
FIG. 12 is an enlarged perspective view of a portion of the delivery vehicle illustrated in FIG. 11.

Referring now to FIGS. 11-13, the details of the delivery vehicles 200 will be described in greater detail. Each delivery vehicle is a semi-autonomous car having an onboard drive system, including an onboard power supply. Each car includes a mechanism for loading and unloading items for delivery. Optionally, each car also includes a gate actuator 230 for selectively actuating the gates 180 to allow the vehicle to selectively change direction.

The car 200 may incorporate any of a variety of mechanisms for loading an item onto the car and discharging the item from the car into one of the bins. Additionally, the loading/unloading mechanism 210 may be specifically tailored for a particular application. In the present instance, the loading/unloading mechanism 210 comprises a displaceable element configured to engage an item stored at a storage location 190 and pull the item onto the car. More specifically, in the present instance, the car includes a displaceable element configured to move toward a tote 15 in a storage location 100. After the displaceable element engages the tote 15, the displaceable element is displaced away from the storage location 100, thereby pulling the tote onto the car 200.

Referring to FIG. 11, in the present instance, the loading/unloading mechanism 210 comprises a displaceable rod or bar 212. The bar 212 extends across the width of the car 200 and both ends are connected with drive chains 214 that extend along the sides of the car. A motor drives the chains to selectively move the chain toward or away from storage locations. For example, as the car approaches a storage location to retrieve a tote 15, the chain may drive the rod toward the storage location so that the bar engages a groove or notch in the bottom of the tote. The chain then reverses so that the bar 212 moves away from the storage location 100. Since the bar is engaged in the notch in the tote, as the bar moves away from the storage location, the bar pulls the tote onto the car. In this way, the loading/unloading mechanism 210 is operable to retrieve items from a storage location. Similarly, to store an item in a storage location 100, the chain 214 of the loading/unloading mechanism 210 drives the bar 212 toward the storage location until the item is in the storage location. The car then moves downwardly to disengage the bar from the tote 15, thereby releasing the tote.

Additionally, since the system 10 includes an array of storage locations 100 adjacent the front side of the track 110 and a similar array of storage locations adjacent the rear side of the track, the loading/unloading mechanism 210 is operable to retrieve and store items in the forward array and the rearward array. Specifically, as shown in FIG. 11, the loading/unloading mechanism 210 includes two bars 212 spaced apart from one another. One bar is operable to engage totes in the forward array, while the second bar is operable to engage totes in the rearward array of storage locations.

As previously discussed, each car may also include a gate actuator 230 for actuating the gate from a first position to a second position so that the car may change directions as the car travels along the track. The actuator 230 may be any of a variety of elements configured to engage a corresponding element on the gate 180. In the present instance, the gate actuator 230 is selectively moveable between a first position and a second position. In the first position, the gate actuator is positioned so that it avoids engagement with the gate or other engagement element(s) along the track. In the second position, the gate actuator 230 is operable to engage a corresponding element along the track to actuate the gate.

For instance, in the present instance, the gate actuator 230 comprises an extendable pin. As shown in FIG. 12, in a first position, the pin is retracted. In a second position, the pin extends outwardly away from the car. Referring to FIG. 13, in the second position, the pin 230 is operable to engage a corresponding element adjacent the track to actuate one of the gates. Specifically, in the extended position, the pin 230 outwardly so that the pin can operatively engage the gate actuator 190 positioned adjacent the gate. The extended pin 230 engages the actuation surface 192, thereby pivoting the arm 193 upwardly as the pin pushes the actuation surface upward as the car travels along the track.

The cars 200 include gate actuators 230 adjacent each wheel 220. Additionally, the four gate actuators on the car are synchronized so that all four are extended and retracted synchronously. In this way, the car actuates the four gates simultaneously to change directions from horizontal to vertical. Specifically, the car 200 actuates two gates at the top of two vertical columns in the front track 115 and two gates at the top of the two vertical columns in the rear track 120.

The car may have a separate drive mechanism for actuating the gate actuators. However, in the present instance, the gate actuators 230 are actuated by the drive mechanism for the loading/unloading mechanism. More specifically, each gate actuator 230 is operatively connected with the chain 214. The gate actuator 230 reciprocally extends and retracts similar to a crank arm as the drive chain 214 is driven. Additionally, when the bar 212 is located in a home position corresponding to an item being loaded on the car, the gate actuator is positioned in a retracted position. However, driving the chain forwardly sufficiently to extend the gate actuators drives the rod 212 toward or away from the track, but not sufficiently to cause the tote to overhand the vehicle. In other words, the chain 214 drives the gate actuators 230 but does not displace the tote on the car sufficiently to interfere with the track 110, gates 180 or gate actuators 190 along the track.

The car includes four wheels 220 that are used to transport the car along the track 110. The wheels 220 are mounted onto two parallel spaced apart axles 215, so that two or the wheels are disposed along the forward edge of the car and two of the wheels are disposed along the rearward edge of the car.

Referring to FIGS. 10-11, each wheel comprises an inner idler roller 224 and an outer gear 222 that cooperates with the drive surface 156 of the track. The idler roller 224 rotates freely relative to the axles, while the outer gear is fixed relative to the axle onto which it is mounted. In this way, rotating the axle operates to rotate the gear 222. Additionally, the idler roller is sized to have a diameter slightly smaller than the distance between the upper wall 152 and the lower wall 154 of the track. In this way, the idler roller may rotate freely within the track, while ensuring that the gear 222 of each wheel remains in operative engagement with the drive surface (i.e. the teeth) 156 of the track. Accordingly, when the vehicle is moving horizontally, the rollers carry the weight of the cart, while the gears 222 cooperate with the drive surface 156 of the track to drive the vehicle along the track.

The car includes an onboard motor for driving the wheels 220. More specifically, the drive motor is operatively connected with the axles to rotate the axles 215, which in turn rotates the gears 222 of the wheels. The drive system for the car may be configured to synchronously drive the car along the track. In the present instance, the drive system is configured so that each gear is driven in a synchronous manner. Specifically, each gear 222 is connected to an end of one of the axles in a manner that substantially impedes rotation of the gear relative to the axle. In this way each axle drives the attached two gears in a synchronous manner. Additionally, in the present instance, both axles are driven in a synchronous manner so that all four gears are driven in a synchronous manner. There are various mechanisms that can be used to synchronously drive the axles. For instance, a pair of drive motors can be used to drive the axles, and the drive motors can be synchronized. Alternatively, a single drive motor may be used to drive both axles. Each axle may include a timing pulley rigidly connected to the axle to prevent rotation of the pulley relative to the axle. Similarly, a timing pulley may be connected to the motor shaft. The drive belt connecting the timing pulley on the axle with the motor may be a timing belt so that rotation of the drive motor is precisely linked to the rotation of the axle. Although a single timing belt can be used to drive both axles synchronously, a pair of timing pulleys may be connected to the motor shaft, and each timing pulley may be connected to a corresponding timing pulley on one of the axles.

The drive motor may include a sensor that is operable to detect the rotation of the motor to thereby determine the distance the car has traveled. Since the gears 222 are rigidly connected with the axles, which are in turn synchronously connected with the drive motor, the forward distance that the car moves can be controlled to correlate to the distance that the drive motor is displaced. Accordingly, the distance that a car has traveled along the determined path depends on the distance through which the car motor is rotated.

To detect the rotation of the drive motor the motor may include a sensor for detecting the amount of rotation of the drive motor. For instance, the sensor 252 may be a sensor such as a hall sensor. The sensor detects the rotation of the motor and sends a signal to the central processor 450, which determines how far along the designated path the car has traveled based on the known information regarding the path and the rotation that the sensor detects for the motor.

The car 200 may be powered by an external power supply, such as a contact along the rail that provides the electric power needed to drive the car. However, in the present instance, the car includes an onboard power source that provides the requisite power for both the drive motor and the motor that drives the load/unload mechanism 210. Additionally, in the present instance, the power supply is rechargeable. Although the power supply may include a power source, such as a rechargeable battery, in the present instance, the power supply is made up of one or more ultracapacitors. The ultracapacitors can accept very high amperage to recharge the ultracapacitors. By using a high current, the ultracapacitors can be recharged in a very short time, such as a few seconds or less.

The car may include one or more contacts for recharging the power source. In the present instance, the car includes a plurality of brushes, such as copper brushes that are spring-loaded so that the brushes are biased outwardly. The brushes cooperate with a charging rail to recharge the power source, as described further below.

For instance, a pair of charging rails may be disposed beneath the lower horizontal rail 140. The charging rails are conductive strips connected with an electrical supply. The charging contacts of the car 200 engage the conductive strips to recharge the ultracapacitors. Specifically, the biasing element of the brushes biases the brushes outwardly toward the charging contacts. The electricity flowing through the charging contact provides a high amperage, low voltage source allowing the ultracapacitors to recharge in a few seconds or less. In addition, since the power supply provided by the ultracapacitors may last for only a few minutes, the car recharges each time it travels through the loading column.

Each car may include a load sensor for detecting that an item is loaded onto the car. The sensor(s) ensure that the item is properly positioned on the car. For instance, the load sensor may include a force detector detecting a weight change or an infrared sensor detecting the presence of an item.

Although the car operates in response to signals received from the central controller 450, which tracks the location of each car, the car may also include a reader for reading indicia along the track to confirm the position of the car. For instance, each storage location may be assigned a unique bar code, and the reader may scan the track or other area around the storage location 100 at which an item is to be delivered. The data that the central processor has regarding the path that the car is to follow and the data regarding the distance the car has traveled based on the data regarding the rotation of the drive motor should be sufficient to determine whether the car 200 is positioned at the appropriate storage location. Nonetheless, it may be desirable to double check the location of the car before the item is discharged into the appropriate storage location. Therefore, the scanner may operate to scan and read information regarding the storage location at which the car is stopped. If the scanned data indicates that the storage location is the appropriate storage location, then the car discharges its item into the storage location. Similarly, the car may have a second reader for reading indicia adjacent the rearward edge of the car. The second reader may be used in applications in which the system is set up to utilize a first series of storage locations 100 along the forward side and a second series of storage locations along the rearward side of the track 110 as shown in FIGS. 1-3.

In the foregoing description, the cars have drive gears that interact with teeth in the track to guide the cars around the track. Additionally, as described further below in the operation section, the location of the car may be controlled based on information regarding how far the car has traveled. In such applications it is desirable to synchronize the drive wheels of the car. However, in some applications alternative control systems may be used. For instance, the location of the cars can be controlled based on signals from sensors positioned along the track or indicators positioned along the track. In such instances, the cars may be configured to use a drive mechanism that is not synchronous as described above.

As discussed further below, the car further includes a processor for controlling the operation of the car in response to signals received from the central processor 450. Additionally, the car includes a wireless transceiver so that the car can continuously communicate with the central processor as it travels along the track. Alternatively, in some applications, it may be desirable to incorporate a plurality of sensors or indicators positioned along the track. The car may include a reader for sensing the sensor signals and/or the indicators, as well as a central processor for controlling the operation of the vehicle in response to the sensors or indicators.

Pick Station

As described previously, the system 10 is configured so that the cars 200 retrieve items from the storage locations 100 and transport the items to the pick station 310. Referring now to FIGS. 1 and 14-17, the pick station 310 will be described in greater detail.

In one mode of operation, the system 10 is used to retrieve items needed to fill an order. The order may be an internal order, such as parts needed in a manufacturing process in a different department, or the order may be a customer order that is to be filled and shipped to the customer. Either way, the system automatically retrieves the items from the storage areas and delivers the items to the picking station so that an operator can pick the required number of an item from a tote. After the item is picked from a tote, the car advances so that the next item required for the order is advanced. The system continues in this manner so that the operator can pick all of the items needed for an order.

In the present instance, the pick station 310 is positioned at one end of the array of storage locations. However, it may be desirable to incorporate multiple pick stations positioned along the track 110. For instance, a second pick station can be positioned along the opposite end of the array of storage locations. Alternatively, multiple pick stations can be provided at one end.

In the present instance, the pick station 310 is configured so that the car travels upwardly to present the contents to the operator so that the operator can more easily retrieve items from the tote 15. Referring to FIG. 1, at the picking station the track includes a curved section 315 that bends upwardly and away from the operator. In this way, the car moves upwardly and then stops at a height that facilitates the operator removing items from the tote. After the operator removes items from the tote, the car moves laterally away from the operator and the vertically to the upper horizontal rail 135.

The system can be configured so that the cars tilt at the pick station 310 thereby making it easier for the operator to retrieve items from the tote. For instance, as the car approaches the pick station, the controller 450 may control the car so that the rearward set of wheels (from the perspective of FIGS. 1 and 14) continue to drive after the forward set of wheel stop. This raises the rearward edge of the car (from the perspective of the operator). After the operator picks the items from the tote, the forward set of wheels (relative to the operator) drive first, thereby leveling the car. Once leveled, the four wheels drive synchronously.

Although the cars may be tilted by controlling operation of the cars, if the wheels of the cars positively engage drive elements in the track, such as the toothed wheels 220 that mesh with teeth in the track as described above, the wheels 220 may bind if the rear wheels are driven at a different rate than the forward wheels. Accordingly, in the present instance, the track system may be modified so that the track moves to tilt the tote toward the operator.

Referring to FIGS. 14-17, the details of the track system in the picking station 310 will be described in greater detail. At the end of the columns of storage locations, the track curves outwardly away from the vertical columns of the system to form the curved track 315 of the pick station 310. The track sections of the pick station include parallel forward track sections 318a, 318b that support and guide the forward axle 215 of the cars 200, see FIG. 11, and parallel rearward track sections 320a, b that support and guide the rear axle 215 of the cars. The forward track sections 318a, b extend vertically upwardly and then curve back toward the vertical columns of storage locations. The rearward track sections 320a, b are substantially parallel to the forward track sections 318a, b and curve substantially similarly to the forward track sections 318 a, b. In this way, the forward and rearward track sections guide the cars so that the cars can maintain a substantially horizontal orientation as the cars are driven along the curved track 315.

In the present instance, the rearward track sections 320a, b are configured so that the rearward axle of the car 200 can be lifted while the car is stopped at the pick station 310. By lifting the rearward axle of the car 200, the tote on the car is tilted to present the contents of the tote to the operator to facilitate the picking process. A variety of lift mechanisms can be utilized to lift the rearward axle of the car while maintaining the front axle of the car in a generally fixed vertical position. For instance, a variety of actuators or drive elements can be utilized to raise the rearward track sections 320a, b, such as solenoids or pneumatic pistons. In the present instance, a portion of the rearward track sections 320a, b is driven by a rotary motor as discussed further below.

The following discussion describes the details of the rearward track sections 320a. The parallel rearward track section 320b, is configured substantially similarly to 320a so that track sections 320a, b oppose one another to maintain the rearward axle of the car 200 in a substantially horizontal orientation while the car is driven through the pick station 310 and while the car is stopped at the pick station.

Figure 15A:
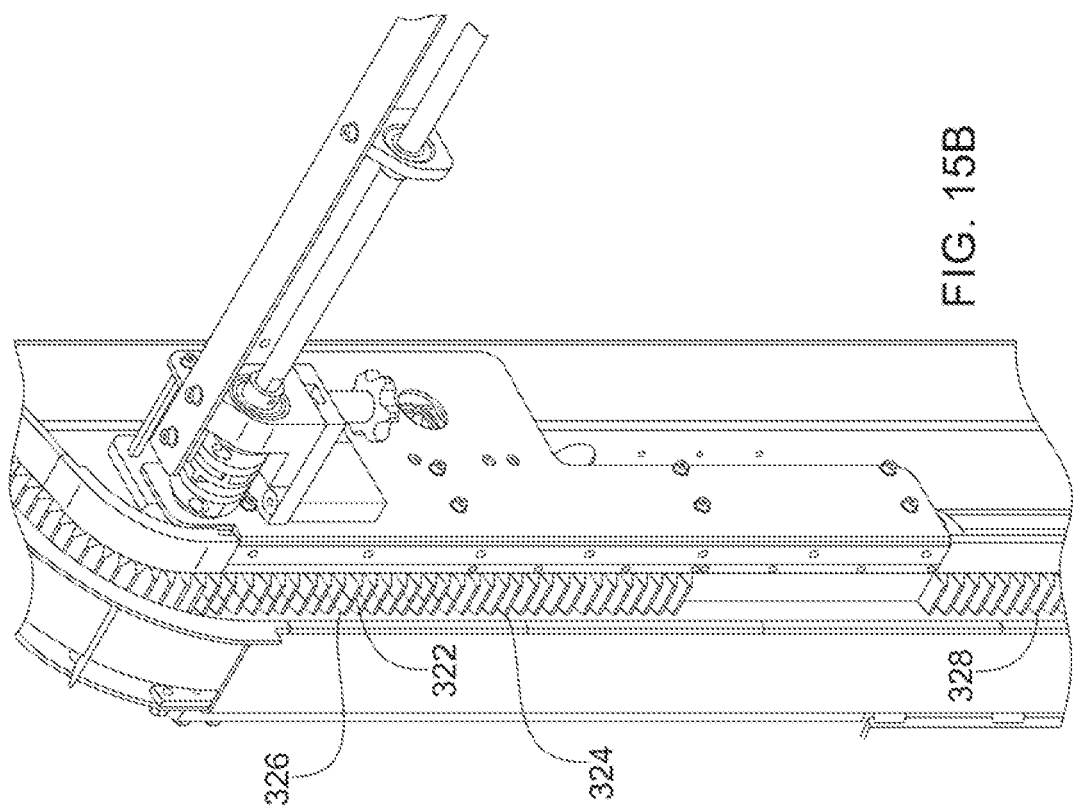
FIG. 15A is an enlarged fragmentary perspective view of a portion of the picking station illustrated in FIG. 14, shown in a first position.
Figure 15B:
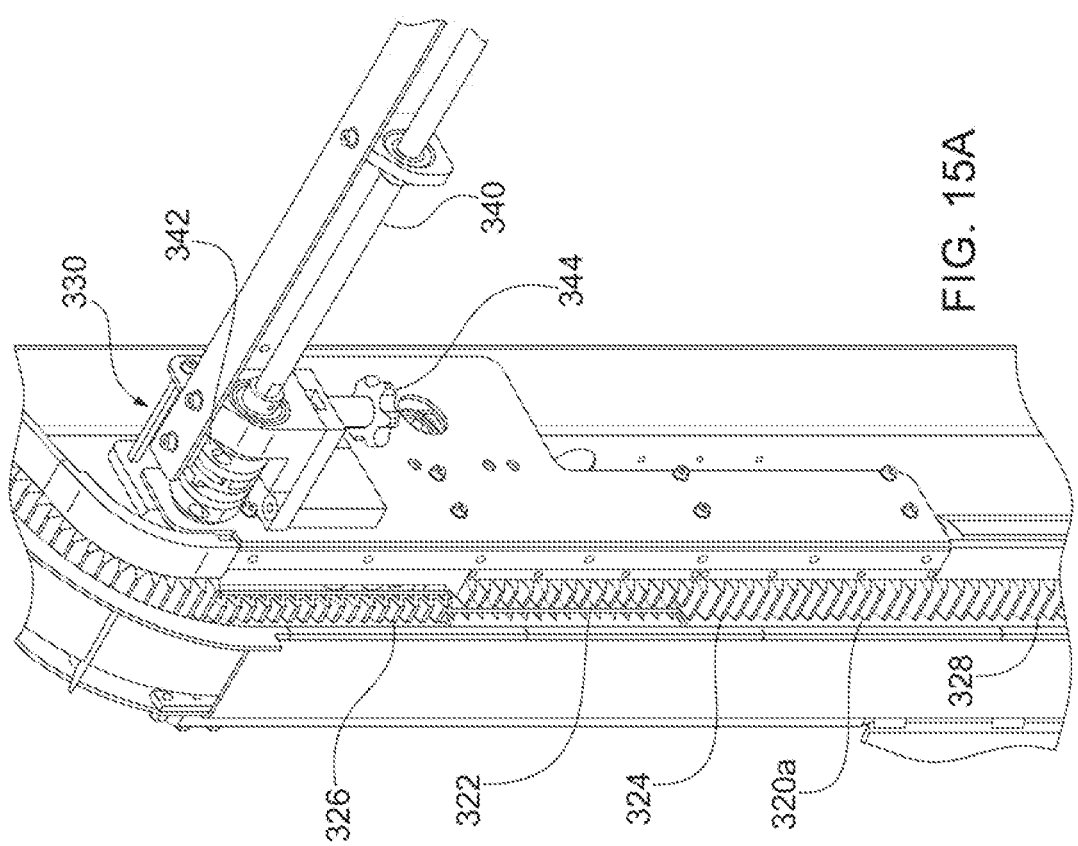
FIG. 15B is an enlarged fragmentary perspective view of the portion of the picking station illustrated in FIG. 15A, shown in a second position.

The rearward track 320 comprises a section of fixed track 328 and a section of moveable track 324. The moveable track section 324 is displaceable between a lower position, as shown in FIG. 15A, and an upper position, as shown in FIG. 15B. Although the moveable track may be a single straight track section having a uniform width, in the present instance, the moveable track 324 comprises upper and lower sections in which the lower section has a full width and the upper section has a reduced width 322. In the present instance, the reduced width section is approximately half the width of the lower section of the moveable track 324, so that the upper section 336 is referred to as the moveable half-track.

An upper fixed track section 326 is fixedly mounted at the upper end of the rearward track 320 above the reduced width portion of the moveable track. In the present instance, the upper fixed track 326 is approximately half the width of the lower fixed track 328 so that upper section is referred to as the fixed half track 326. As shown in FIG. 15A, the fixed tracks 326, 328 have drive teeth similar to the sections of the track 110 used throughout the system as described above. The moveable track 324 also has drive teeth spaced and configured similarly to the fixed track section.

The teeth of the moveable half track section 322 and the fixed half track section are configured so that when the moveable half track 322 is displaced upwardly next to the fixed half track 326 as shown in FIG. 15B, the teeth of the moveable half track 322 align with the teeth of the fixed half track 326 to form a full width track having a width similar to the width of the teeth of the lower fixed track 328.

The system includes a track lift assembly 330 for displacing the moveable half track 322 between the upper and lower positions as shown in FIGS. 14-16. In the present instance, the track lift assembly 330 includes a rotary motor, such as servomotor 332 that reciprocally drives the moveable half track 322 up and down. More specifically, the moveable track 324 is fixedly attached to an endless belt 336a entrained between a pair of pulleys above and below the moveable track. For instance, the moveable track may be clamped to the lifter belt 336a.

Although the motor 332 may directly drive the lifter belt 336a, the track lift assembly 330 may include one or more drive belts to reduce the angular velocity and increase the torque provided by the motor. In the present instance, the track lift assembly includes a first drive belt 333 driven by the motor 332. The assembly 330 also includes a second drive belt 334 that is driven by the first drive belt 333, which drives the lifter belt 336a. In the present instance, the first and second drive belts 333, 334 are timing belts.

When the motor 332 is driven in a first direction, the drive belts 333, 334 drive the lifter belt 336a in a first direction to lift the moveable half track 322 into a raised position as shown in FIG. 15B. Driving the motor 332 in a reverse or second direction, the drive belts 333, 334 drive the lifter belt in the reverse direction to lower the moveable half track into the position shown in FIG. 15A.

Figure 17:
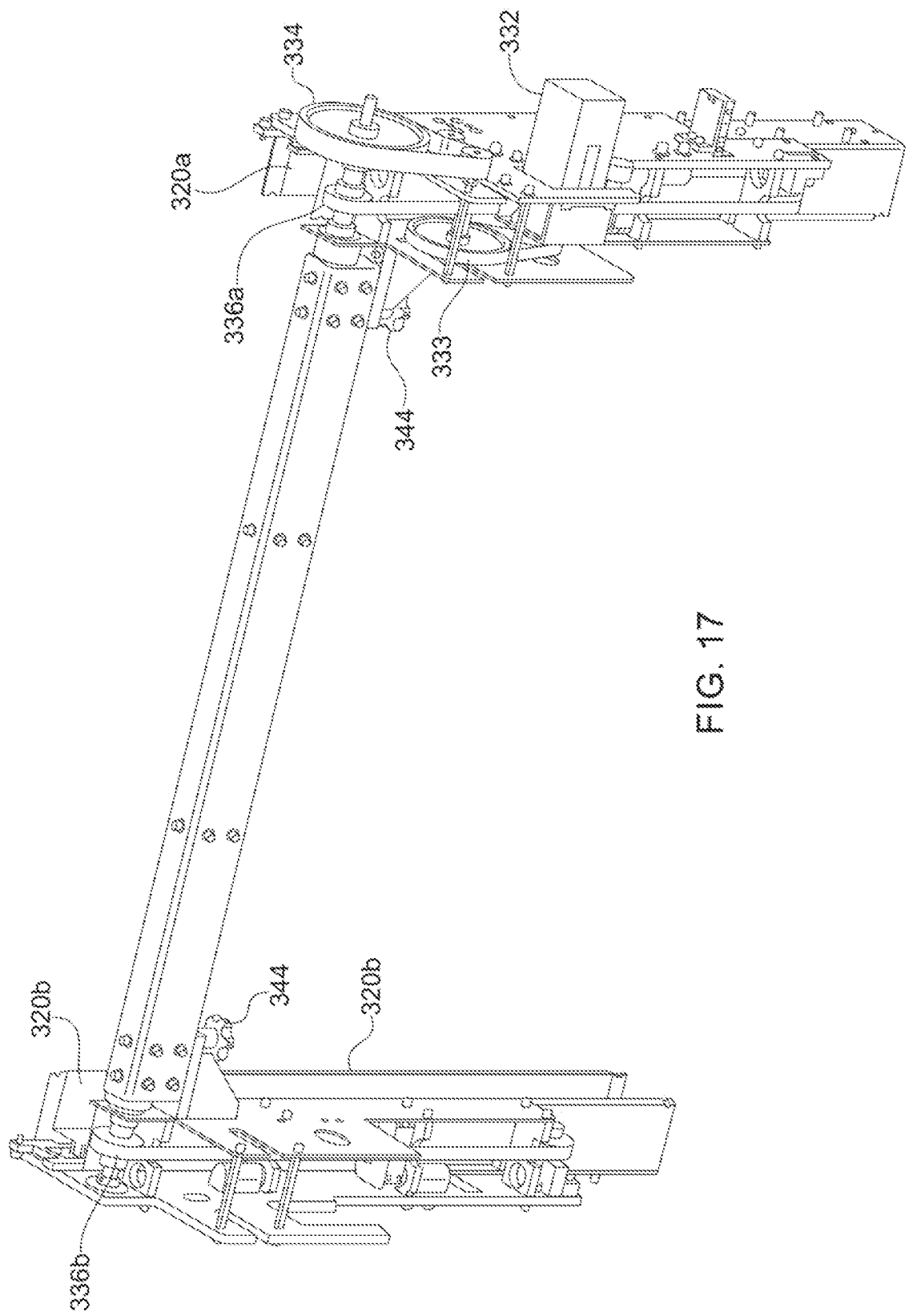
FIG. 17 is an enlarged fragmentary perspective view of a portion of the picking station illustrated in FIG. 14.

Although, a second motor may be provided to drive the moveable track of the rearward track section designated 320b in FIG. 14, in the present instance, the motor 332 drives the moveable track sections of both rearward tracks 320a, b. The moveable portion of rearward track 320b is configured substantially similar to the moveable track of rearward track 320a and is fixedly connected with a lifter belt 336b substantially similar to the lifter belt 336a described above. To drive the lifter belts 336a, b synchronously, a drive shaft 340 interconnects lifter belt 336b with lifter belt 336a as shown in FIGS. 16-17. Specifically, drive belt 334 drives the drive shaft 340, which in turn directly drives lifter belts 336 a, b.

As shown in FIGS. 14 and 17, the drive shaft 340 spans between the left hand rear track 320a and the right hand rear track 320b. In certain instance, it may be desirable or necessary for maintenance equipment to be moved into the space between the left hand track section and the right hand track section. Therefore, in the present instance, the drive shaft is readily removable from between rear tracks 320a and 320b. More specifically, the drive shaft 340 comprises an elongated shaft extending between a stub shaft that drives the left hand lifter belt 336a and a stub shaft that drives the right hand lifter belt 336b. Additionally, in the present instance, a shaft interlock 342 rotationally fixes the shaft to the stub shafts driving lifter belts 336 a, b. The shaft interlock is releasably connectable so that the elongated shaft can be readily detached from the stub shafts. In the present instance, an interlock release is manually actuable to disconnect the shaft interlocks so that the shaft can be disconnected from the stub shafts. For instance, the interlock release may be a rotatable knob as shown in FIG. 15A.

Configured as described above, the track in the pick station 310 is operable tilt a car 200 in the pick station as follows. When the car enters the pick station, the car is driven partway up the vertical track sections 318a, b and 320a, b. When the car reaches a predetermined vertical position along 318a, b and 320a, b, the controller controls the car so that the car stops at a predetermined height in the picking station. When the car stops in the pick station 310, the car is in a generally or substantially horizontal orientation. In the present instance, the car is displaced vertically upwardly until the rear wheels 220 of the car 200 engage the lower section of the moveable track 324 and the car is stopped so that the car wheels 220 are engaged with the lower section of the moveable track. Once the car is stopped in the pick station, the controller controls the operation of the motor 332 to drive the motor in the first direction, which displaces the moveable tracks 324a, b upwardly into the position shown in FIG. 15B. Since the rear wheels 220 of the car 200 are engaged with the moveable tracks, displacing the moveable track upwardly displaces the rear wheels of the car upwardly, thereby lifting the rearward edge of the tote on the car upwardly. In this way, the tote is tilted relative to the horizon to present the contents of the tote to the operator at the pick station so that the operator can more easily remove items from the tote. Once the operator provides a signal to the system indicating that the appropriate items were removed from the tote, the system controls the track to lower the car into a substantially horizontal position. Specifically, the controller controls the motor 332 so that the motor drives in a reverse direction, thereby driving the lifter belt in a reverse direction to lower the moveable track sections 324a, b. Since the rear wheels 220 of the car are engaged with the moveable tracks 324a, b, lowering the moveable tracks lowers the rear wheels of the car downwardly until the car is substantially horizontal.

After the moveable tracks are lowered into the lowered position shown in FIG. 15A, the controller stops the motor 332, which stops movement of the moveable tracks. While the moveable tracks are in a stationary position and the car is substantially horizontal, the car drives up the vertical tracks of the pick station so that the rear wheels of the car drive up the moveable tracks 324a, b and then up the fixed half track 326 while the car is substantially horizontal.

The pick station 310 may include a plurality of items to improve the efficiency of the pick station. For instance, the pick station may include a monitor to display information to aid the operator. As the car approaches the pick station, the system 10 may display information such as how many items need to be picked from the tote for the order. Additionally, since the operator may pick items for multiple orders, the system may display which order(s) the item is to be picked for, in addition to how many of the item are to be picked for each order. The system may also display information such as how many items should be remaining in the tote after the operator picks the appropriate number of items from the tote.

The system may also include a sensor for sensing that an item has been removed from a tote so that the car can automatically advance away from the pick station after the operator picks the items. Similarly, the system may include a manually actuable item, such as a button, that the operator actuates after picking the appropriate number of items from a tote. After the operator actuates the button, the system advances the tote away from the picking station.

In the foregoing description, the system is discussed as being used to retrieve a discrete number of items to be used to fill an order. The operator picks the items from one or more totes as the totes are presented to the operator and the operator agglomerates the items, such as by placing the items into a container for shipping. Alternatively, rather than agglomerating a plurality of items, the system may incorporate one or more buffer conveyors that convey items away from the system. The operator places the picked items onto the buffer conveyor in the appropriate order and the conveyor(s) convey the items away from the system.

Operation

After the operator removes the appropriate item(s) from one of the cars, the car moves away from the pick station 310. Specifically, the onboard controller sends a signal to start the drive motor. The drive motor rotates the axles, which in turn rotates the gears 222 on the wheels 220. The gears 222 mesh with the drive surface 156 of the vertical rails to drive the car upwardly. Specifically, the gears and the drive surfaces mesh and operate as a rack and pinion mechanism, translating the rotational motion of the wheels into linear motion along the track 110.

As the car moves away from the pick station, the system determines the storage location 190 where the item the car is currently carrying is to be returned, as well as the next item that the car is to retrieve. As discussed below, both of these determinations may require significant computation. However, since the cars move up the column from the pick station, the destination for the car does not need to be determined until after the car reaches the first gate along the upper rail 135. If the system is not able to determine which destination the car is to be directed, the car can simply loop around the track back to the picking station and re-start the process.

The following discussion describes the operation of the system assuming that the destination and route information for the car are determined by the time the car reaches the upper rail 135.

Once the central controller 450 determines the appropriate storage location 100 for the item, the route for the car is determined. Specifically, the central controller determines the route for the car and communicates information to the car regarding the storage location into which the item is to be delivered. The central controller then controls the operation of the car to actuate the gates along the track as necessary to direct the car to the appropriate column. Once the car reaches the appropriate column the car moves down the column to the appropriate storage location. The car stops at the appropriate storage location 100 and the onboard controller sends an appropriate signal to the car to drive the chain 214, which advances the bar 212 thereby driving the tote into the appropriate storage location.

As the car 200 travels along the upper rail 135 and approaches a column, the gates for the vertical rails 130 are controlled as follows. If the car is to pass over the column on the way to the next column, the gates remain in the closed position, as shown in FIG. 4. Specifically, both gates at the top of the column are closed so that the outer race 184 of the gate aligns with the straight track, with the outer race aligning with the drive surface 156 of the track 110. In this way, the gates provide a straight drive surface that cooperates with the drive surface 156 to allow the car to travel over the column.

Figure 5:
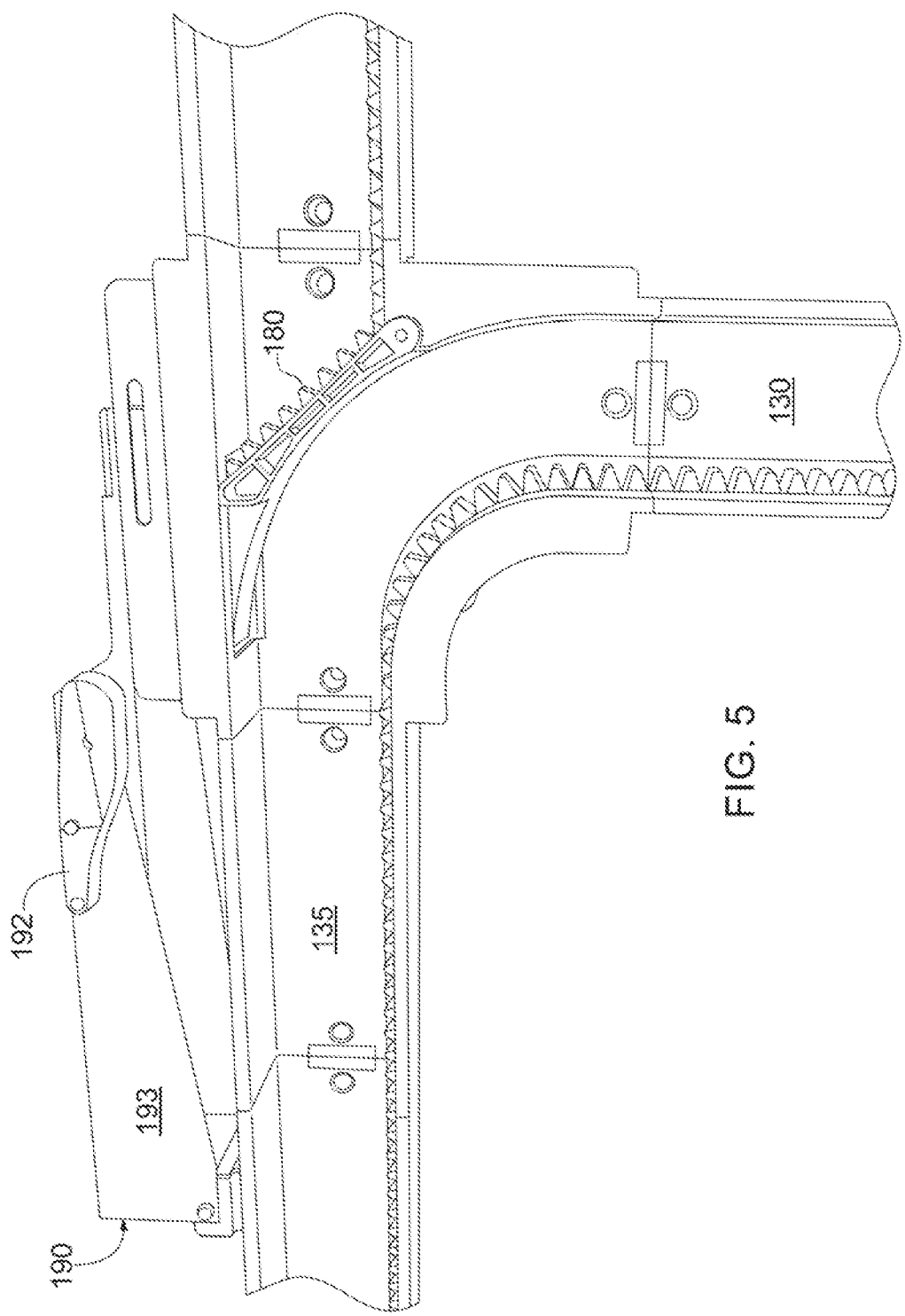
FIG. 5 is an enlarged fragmentary view of a portion of track of the apparatus illustrated in FIG. 1, showing details of a gate in an open position.
Figure 7:
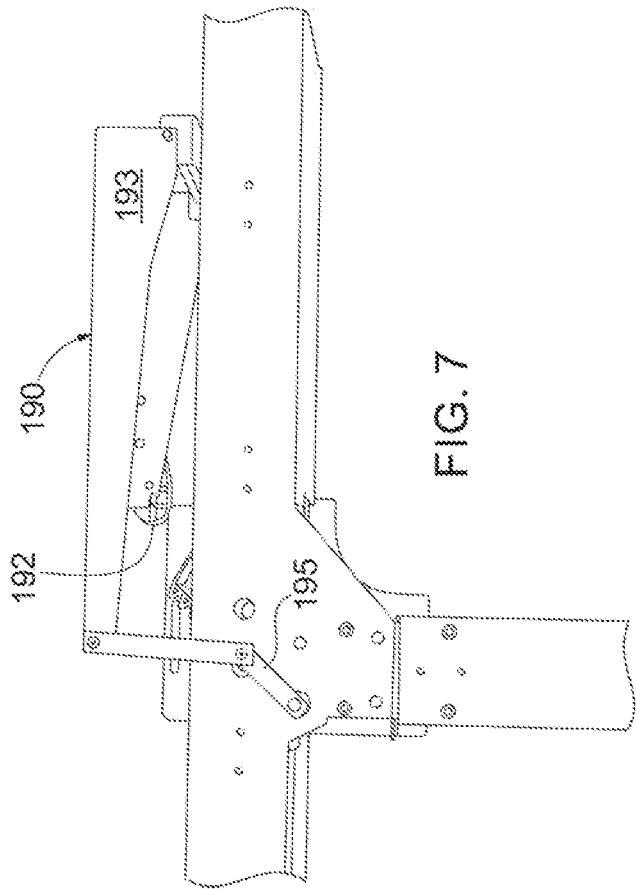
FIG. 7 is an enlarged fragmentary perspective view of a portion of the track illustrated in FIG. 5, showing details of a gate from a rearward view.
Figure 6:
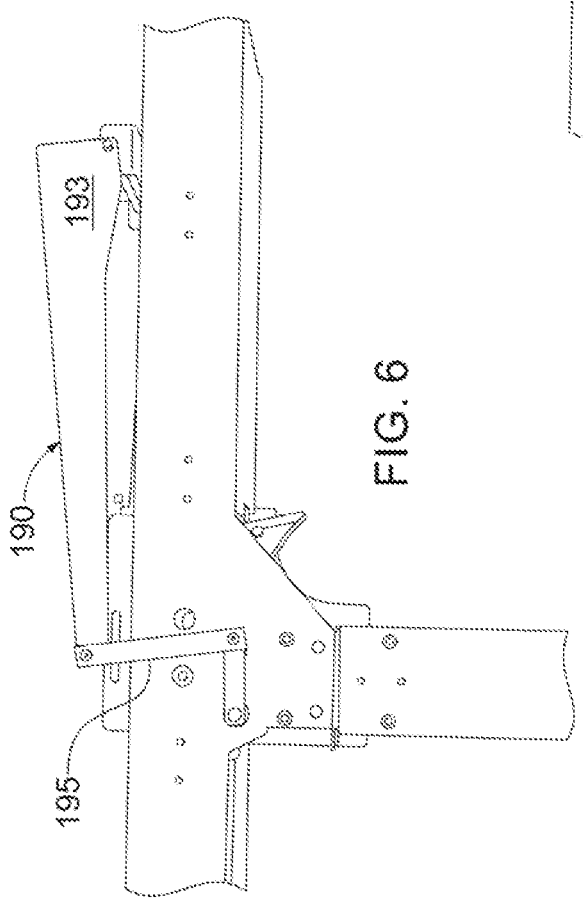
FIG. 6 is an enlarged fragmentary perspective view of a portion of the track illustrated in FIG. 4, showing details of a gate from a rearward view.

When the car comes to a column that it is to turn down, the gates are controlled as follows. Referring to FIG. 5, the columns can be seen without the totes and without the picking station. The view in FIG. 2 is from the front of the apparatus 10, so the car will be traveling along the upper rail from the right to the left in the perspective of FIG. 2. In the following discussion, the car is to be conveyed to a storage location in the column designated C in FIG. 2. Column C includes two pairs of vertical legs. The first pair is front and back vertical legs 130c on the left side of column C; the second pair is front and back vertical legs 130d on the right side of column C.

In order for the car to travel down column C, the wheels on the left side of the car travel down legs 130c and the right side wheels travel down legs 130d. Therefore, as the car approaches column C, the gates at the top of 130d are displaced to the closed position so that the left side wheels remain on the upper rail and pass over the right side legs 130d. After the left side wheels of the car pass over the right legs 130c, the gates 180 at the top of the right legs 130d are displaced into the open position so that the right side wheels can turn down legs 130d. Specifically, after the left side wheels pass right legs 130d, the gate actuator 230 on the right axle of the vehicle contacts the actuator 190 on the gate 180 to displace the gates into the open position, as shown in FIG. 9 (note that the view in FIG. 9 is taken from the rear side of the apparatus so that the perspective of the gates is reversed relative to the front side). The gates 180 block the straight path through the intersection 170 and the curved inner race 182 of the gates direct the right side wheels down vertical legs 130d. Similarly, the gates 180 at the top of the left side legs 130c are displaced into the open position to direct the left side wheels down vertical legs 130c.

As the car approaches the intersections at the bottom of legs 130c and 130d, the gates are operated similarly to the above description, but in reverse. Specifically, as the car approaches the intersections 170 at the bottom of legs 130c and 130d, the gates 180 in the intersections are displaced into the opened position so that the gates direct the forward and leading wheels to turn down the lower rail. From the perspective of FIG. 2, the car travels from left to right after the car reaches the lower rail. After the car passes though the intersections at the bottom of the rails 130c, 130d, the gates at the bottom of right side legs 130d are displaced into the closed position before the left side wheels of the car reach the intersection at the bottom of the right side legs 130d. In this way, the left side wheels of the car pass straight through the intersection at the bottom of legs 130d along the bottom rail 140.

One of the advantages of the system as described above is that the orientation of the cars does not substantially change as the cars move from travelling horizontally (along the upper or lower rails) to vertically (down one of the columns). Specifically, when a car is travelling horizontally, the two front geared wheels 220 cooperate with the upper or lower horizontal rail 135 or 140 of the front track 115, and the two rear geared wheels 220 cooperate with the corresponding upper or lower rail 135 or 140 of the rear track 120. As the car passes through a gate and then into a column, the two front geared wheels engage a pair of vertical legs 130 in the front track 115, and the two rear geared wheels engage the corresponding vertical legs in the rear track 120. It should be noted that when it is stated that the orientation of the cars relative to the horizon do not change, this refers to the travel of the vehicles around the track. Even though the cars may tilt relative to the horizon at the picking station, the cars are still considered to remain in a generally constant orientation relative to the horizon as the cars travel along the track 110.

As the car travels from the horizontal rails to the vertical columns or from vertical to horizontal, the tracks allow all four geared wheels to be positioned at the same height. In this way, as the car travels along the track it does not skew or tilt as it changes between moving horizontally and vertically. Additionally, it may be desirable to configure the cars with a single axle. In such a configuration, the car would be oriented generally vertically as opposed to the generally horizontal orientation of the cars described above. In the single axle configuration, the weight of the cars would maintain the orientation of the cars. However, when using a single axle car, the orientation of the storage locations would be re-configured to accommodate the vertical orientation of the cars.

Traffic Control

Since the system includes a number of cars 200, the system controls the operation of the different cars to ensure the cars do not collide into one another. In the following discussion, this is referred to as traffic control.

A variety of methodologies can be used for traffic control. For instance, the traffic control can be a distributed system in which each car monitors its position relative to adjacent cars and the onboard controller controls the car accordingly. One example of such as system utilizes proximity sensors on each car. If the proximity sensor for a car detects a car within a predefined distance ahead of the car, the onboard controller for the trailing car may control the car by slowing down or stopping the trailing car. Similarly, if a car detects a car within a predefined distance behind the car, the lead car may speed up unless the lead car detects a car ahead of it within the predefined distance. In this way, the cars may control the speed of the cars independently based on the feedback from the proximity sensors.

Although the system may use a distributed system for traffic control, in the present instance, the system uses a centralized system for traffic control. Specifically, the central controller 450 tracks the position of each car 200 and provides traffic control signals to each car based on the position of each car relative to adjacent cars and based on the route for each car.

In the present instance, the central controller 450 operates as the traffic controller, continuously communicating with the cars as the cars travel along the track 110. For each car, the central controller determines the distance that each car can travel and communicates this information with the cars. For instance, if car B is following car A along the track, and car A is at point A, car B can safely travel to a point just before point A without crashing into car A. As car A advances to a subsequent point B along the track, car B can travel safely to a point just before point B without crashing into car A.

The cars continuously communicate with the central controller to provide information indicative of their positions, so that the central controller can continuously update the safe distances for each car as the cars advance around the track.

Although the foregoing discussion is limited to determining safe zones based on the positions of the various cars on the track, the determination of safe zones is based on other factors that affect the traffic. For instance, when calculating the safe distance for a car, the central controller considers the distance between the car and the next gate, as well as the distance to the destination storage location for the car.

As can be seen from the foregoing, increasing the frequency of communication between the cars and the central controller increases the efficiency of the traffic flow along the track. Accordingly, in the present instance, the traffic control is designed to communicate with a car once for every inch the car travels along the track. Therefore, if a car travels at 25 inches per second, the central controller communicates with the car every 40 msec. Further, it is desirable to have the cars travel at up to 50 inch/sec. Therefore, it is desirable to configure the communications to allow the cars to communicate with the central controller every 20 msec.

In addition, to the foregoing variables used to calculate safe distances, information regarding the track profile ahead of each car is used to calculate safe distances. For instance, the central controller determines whether the path ahead of a car is sideways movement, uphill movement (i.e. movement vertically upwardly) or downhill movement (i.e. movement vertically downwardly).

One of the issues in traffic control relates to merging at intersections 170. The problem arises when a car needs to merge onto the return rail 140. If two cars will arrive at the intersection close enough to collide, one of the cars needs to have priority and the other car needs to wait or slow down to allow the first car to go through.

A first method for controlling merging traffic is based on determining the next gap large enough for a car to have time to pass through an intersection without colliding with another car. In other words, if a first car approaches an intersection and it is determined that the gap between the first car and a second car is not sufficient for the first car to pass through, the first car waits at the intersection until there is a gap large enough to allow the first car to pass through.

A second method for controlling merging traffic is based on determining which car is closest to the homing sensor at the pick station 310. The car with the shortest distance to the homing sensor gets priority at the intersection.

Another factor that the traffic controller considers when calculating safe distances relates to the position of cars in adjacent columns. In the present instance, most of the adjacent columns share a common vertical rail. For instance, in FIG. 5, the leftmost column uses vertical rails 130a and 130b. The column next to the leftmost column uses vertical rails 130b and 130c.

However, in the present instance, some of the columns may have two vertical rails 130 that are independent from the adjacent columns. For instance, the loading column 300 has two independent rails that are not shared with the adjacent column. Therefore, cars can travel up the loading column without regard to the position of cars in the column next to the loading column. Furthermore, as shown in FIG. 5, it may be desirable to configure the column next to the loading column so that it also has two independent vertical rails. In this way, cars can more freely travel up the loading column and down the adjacent column to provide a buffer loop as described previously.

Accordingly, when calculating safe distances, the traffic controller evaluates the position of cars in adjacent columns if the cars share a common vertical rail to ensure that the two cars do not collide as the car travel down the adjacent columns.

Another aspect of the traffic control relates to how the cars are sequenced to retrieve items for an order or a series of orders. Specifically, in order to efficiently fill orders, the items should be delivered to the pick station in a sequence corresponding to the order of the items as required by one or more orders. Specifically, if an order requires four separate items stored in four separate locations, it is desirable to retrieve the items so that the cars deliver the items to the pick station at generally at the same time so that the items can be picked and used to fill the order. Accordingly, the central controller 450 calculates the sequence for assigning items to a series of cars to be used to fulfill an order.

By way of example, the following discussion describes the steps that the system takes to fill an order for four separate items stored in four separate storage locations. The system 10 will assign each of the four items to one of four cars as follows.

The central controller 450 calculates the theoretical time it will take the cars to retrieve each item in an order. Specifically, for each of the items in an order, the central controller calculates the theoretical time it will take a car to travel from the pick station to the storage location where the item is stored and then from the storage location back to the pick station. Although the estimates may be based on the traffic circulating in the track, in the present instance, the estimates are calculated as if there is no traffic in the track. After the estimates are determined for each item in an order, the central controller 450 assigns the items to a series of cars to attempt to have the cars return at approximately the same time.

For instance, in an order for four items, the first item may be closest to the picking station and the last item may be farthest from the picking station, with the second and third items in between. Accordingly, the first car may be assigned to retrieve the fourth item, since it will take the longest to retrieve. The second and third cars may be assigned the second and third items in the order, and the fourth car may be assigned the first item in the order since it will take the least amount of time to retrieve. In this way, the system controls the sequence of assigning cars to retrieve items in order to improve the likelihood that the cars will return to the picking station as a series of consecutive cars carrying the items for the order. In some applications it is desirable to control the sequence of the cars so that the cars arrive at the picking station in the exact sequence requested for an order (ie. First item first, second item next, etc). However, in many applications it is sufficient to have the cars arrive in a sequence of continuous cars having items for the order (i.e. four cars containing the items for the order without any cars in between the four cars with items of other orders).

Although the above description discusses assigning retrieval tasks to a series of cars so that the cars return a sequence of cars to fill an order, it should be understood that the picking station may be configured so that the operator can simultaneously pick items for more than one order. Therefore, the system can further improve the flow of cars and the timing of the retrieval so that the cars return items for multiple orders. In essence, rather than considering the items for only one order and assigning the cars to retrieve the items for that order before assigning cars for the next order, the system can consider the items for two orders in the aggregate and assign the cars for all the items for a plurality of orders (such as two or three) as though the items were for a single order and assign the cars accordingly. When the cars return with the items, the system may then prompt the operator as to which order the item is for, such as by providing an indicator on the display at the pick station.

Further, in addition to the basic sequencing described above, the system may further control the operation of the cars to improve the likelihood that the cars arrive at the picking station as a consecutive sequence of items for an order. Specifically, after a car retrieves an item, the system calculates an estimate of the time required to return to the picking station. This time estimate will typically differ from the time estimate previously calculated due to traffic along the track that may delay the car. The estimated arrival time is then compared with the estimated arrival time of the other items in the order. If the arrival time for the car is too early relative to other cars retrieving items for the order, the system can delay the car as necessary to control the arrival sequence. Additionally, the arrival time may be continuously updated as the car travels along the track so that the system can selectively control the movement of the cars to delay the cars as necessary to control the arrival sequence at the pick station 310. Further, as described above, although the discussion describes controlling the sequence of items for a particular order, the system may aggregate the items in more than one order if the operator is able to pick items for a plurality of orders in parallel rather than in strict sequence by order.

As described above, the system assigns the sequence of items assigned to the vehicles based on the estimated time to retrieve an item. However, it should be understood that typically when a car leaves the pick station, the car is carrying an item that needs to be returned to one of the storage locations. Therefore, the retrieval time for a new item may include the time it will take to return the item before the car is able to pick up the next item.

In one embodiment, the system may have a generally rigid manner for defining the location where a particular item is stored. Under such a method of operation, a particular item is stored in one or more defined storage locations, and after such an item is retrieved and delivered to the pick station, the car returns to the same storage location from where the item was retrieved (or one of a plurality of locations defined to receive such items). However, returning an item to the same storage location from where the item was retrieved can increase the time required to retrieve a new item, since the new item may be located far away from where the previous item was located before it was retrieved.

Accordingly, when assigning the sequence of items to cars, the system may factor in the time it takes to return an item to its original storage location and then travel to the location of the new item. Alternatively, rather than returning an item to the storage location from which it was retrieved, the system may search for the open storage location closest to the next item that the car is to retrieve. The car can then unload the item into the open storage location before moving to the storage location for the next item to be retrieved. The central controller then stores the location of the new storage location so that the items can be retrieved as necessary. In this way, the system can continuously re-assign the storage location of items as the items are returned to storage locations. In order to improve the likelihood that an open storage location is proximate the next item to be retrieved, in the present instance, the array of storage locations is assigned so that there are more storage locations than items to be stored. For instance, each column in the array may have one or more empty storage locations. However, the number of empty storage locations in a column may fluctuate as items are retrieved and returned.

In the foregoing discussion, the delivery of items was described in relation to an array of storage locations disposed on the front of the sorting station. However, as illustrated in FIG. 1, the number of storage locations in the system can be doubled by attaching a rear array of storage locations on the back side of the sorting station. In this way, the cars can deliver items to storage locations on the front side of the sorting station by traveling to the storage location and then driving the loading/unloading mechanism 210 to unload the item into the front storage location. Alternatively, the cars can deliver items to storage locations on the rear side of the sorting station by traveling to the storage location and then driving the loading/unloading mechanism 210 rearwardly to unload the item into the rear storage location.

Additionally, the system 100 is modular and can be expanded as necessary by attaching an additional section to the left end of the array of storage locations 100. Further, although the foregoing describes the array of storage locations as being essentially a two dimensional array in which the cars simply travel in X and Y directions, the system can be expanded to add additional "runs" of track. Specifically, a separate array of locations parallel to or perpendicular to the sorting station illustrated in FIG. 1 may be connected to the sorting station. In this way, the car would travel in a third dimension relative to the X and Y directions of the sorting station illustrated in FIG. 1. For instance, additional sections of track may be connected to the sorting station illustrated in FIG. 1 perpendicular to the illustrated sorting station, so that the additional track forms an L-shape intersecting the loading column. In such a configuration, gates selectively direct the cars either down the upper rail 135 or rearwardly toward the additional track. Similarly, a plurality of parallel rows of storage locations can be interconnected so that the cars selectively travel along a crossover rail until the car reaches the appropriate row. The car then travels down the row until it reaches the appropriate column as described above.

It will be recognized by those skilled in the art that changes or modifications may be made to the above-described embodiments without departing from the broad inventive concepts of the invention. For instance, in the above description, the system uses a wireless communication between the cars and the central controller. In an alternative embodiment, a communication line may be installed on the track and the cars may communicate with the central controller over a hard wired communication link.

Input Station

An input station 350 can be provided for storing new items in the system or for re-stocking the storage locations as the item are used to fill orders. A variety of mechanisms can be used to stock items into the system 10. For instance, input areas can be placed on the vertical rails leading away from the picking station 310. The input area would be similar to storage locations 100 so that a vehicle can move to the input area an retrieve the new items in the same way that the vehicle retrieves items from the storage area during normal operation. However, the input area would interface with a conveyor or other mechanism from outside the track 110, for loading items into the input area. Additionally, the input station 350 may include a plurality of input areas. For instance, three input areas may be positioned along the vertical rail, with the three input locations being located over top one another. In this way, a plurality of input locations can be used to load items onto cars 200 to re-stock items in the system 10. If a plurality of input locations are used, preferably each input location operates in connection with an input mechanism for loading items into the input locations.

The input station 350 communicates with and may be controlled by the central controller 450. For instance, the input station 350 may include a scanner or other input mechanism for scanning an identification item, such as a bar code on the new items to be stored in the system. Alternatively, an operator may identify the items at the input station and input identifying information into the system via an operator interface, such as a keyboard or touch screen. In this way, the system may automatically identify new stock items or an operator may input information into the system manually or a combination of automatic and manual data entry may be used.

In the foregoing description, the system is described as having a single input station 350. However, it may be desirable to incorporate a plurality of input stations positioned along the system 10. By using a plurality of input stations, the feed rate of re-stocking items or adding new items may be increased. In addition, the input stations may be configured to process different types of items. In this way, each input station could be configured to efficiently process a particular category of items.

It should therefore be understood that this invention is not limited to the particular embodiments described herein, but is intended to include all changes and modifications that are within the scope and spirit of the invention as set forth in the claims.

What is claimed is:

1. A method for operating an automated storage and retrieval system, comprising the steps of:
    moving a plurality of vehicles within a first aisle between a first rack of storage locations and a second rack of storage locations, wherein the step of conveying comprises:
        moving a first of the vehicles vertically to align with a first of the storage locations;
    transferring the first container from the first storage location onto the first vehicle;
    moving the first vehicle with the first container within the aisle to a workstation positioned adjacent an end of the aisle;
    retrieving an item from the first container while the first vehicle is positioned at the workstation;
    moving the first vehicle within the aisle away from the workstation after the step of retrieving the item;
    aligning the first vehicle with a second of the storage locations; and
    transferring the first container from the first vehicle into the second storage location.

2. The method of claim 1 wherein the step of moving a plurality of vehicles within a first aisle comprises the step of moving each vehicle along one of a plurality of loops within the aisle.

3. The method of claim 2 wherein the step of transferring the first container from the first storage location comprises actuating a transfer mechanism on the first vehicle to pull the first container out of the first storage location and onto the first vehicle.

4. The method of claim 3 wherein the first vehicle comprises a rechargeable power storage element for providing power for the first vehicle and wherein the method comprises the step of recharging the first vehicle during one of the step of moving the first vehicle with the first container within the aisle to a workstation and the step of moving the first vehicle within the aisle away from the workstation.

5. The method of claim 1 wherein the workstation is positioned at the end of the aisle between the first and second racks and wherein the step of moving the first vehicle with the first container within the aisle to the workstation comprises moving the first vehicle vertically upwardly at the workstation.

6. The method of claim 1 comprising a plurality of gates operable to control the direction of travel of the vehicles during the step of moving the plurality of vehicles within the first aisle wherein the method includes the step of selectively actuating a gate actuator on the first vehicle to actuate one of the gates as the first vehicle moves within the aisle.

7. The method of claim 1 wherein the step of moving the first vehicle vertically comprises driving the first vehicle vertically along a vertically oriented track.

8. The method of claim 7 wherein the vertically oriented track comprises a plurality of engagement elements and the step of moving the first vehicle vertically comprises driving a drive element configured to cooperate with the engagement elements.

9. The method of claim 1 wherein the step of moving the first vehicle within the aisle away from the workstation comprises driving the first vehicle vertically upwardly from the workstation after the item is removed from the first vehicle.

10. The method of claim 9 wherein the step of driving the first vehicle vertically upwardly from the workstation comprises the step of driving the first vehicle laterally and then vertically upwardly away from the output station.

11. An automated storage and retrieval system, comprising:
    a first rack of storage locations configured to receive one or more containers;
    a second rack of storage locations spaced apart from the first rack to form an aisle between the first rack and the second rack wherein the storage locations in the second rack are configured to receive one or more containers;
    a plurality of vehicles operable within the aisle to deliver containers to the storage locations and retrieve containers from the storage locations wherein each vehicle comprises:
        one or more wheels for driving the vehicle vertically and horizontally;
        a rechargeable power storage element for powering operation of the vehicle; and
        a transfer mechanism configured to transfer the containers between the storage locations and the vehicle;

moving a first of the vehicles vertically to align with a first of the storage locations;

a workstation located adjacent the end of the aisle;

a central processor configured to execute instructions for:
transferring a first container from the first storage location onto a first of the vehicles;
moving the first vehicle with the first container within the aisle to workstation;
stopping the first vehicle at the workstation so that an operator can retrieve an item from the first container;
moving the first vehicle within the aisle away from the workstation after the step of retrieving the item;
aligning the first vehicle with a second of the storage locations of the first or second rack; and
transferring the first container from the first vehicle into the second storage location.

12. The system of claim 11 comprising a guide forming a plurality of loops within the aisle wherein the central controller is configured to control the movement of a plurality of vehicles within a first aisle so that each vehicle moves along one of the plurality of loops.

13. The system of claim 12 wherein the transfer mechanism is configured to pull the first container out of the first storage location and onto the first vehicle.

14. The system of claim 13 comprising a charging element configured to recharging the first vehicle while the first vehicle moves within the aisle.

15. The system of claim 11 comprising a vertical guide configured to guide the vehicles upwardly away from the workstation when the vehicles leave the workstation.

16. The system of claim 15 comprising a lateral guide configured to guide the vehicles laterally away from the workstation prior to being guided upwardly by the vertical guide.

17. The system of claim 11 comprising a plurality of gates operable to control the direction of travel of the vehicles within the aisle.

18. The system of claim 11 comprising a plurality of horizontal and vertical guide elements configured to guide the vehicle vertically and horizontally within the aisle.

19. The system of claim 18 wherein the track comprises a plurality of engagement elements and the wheel of each vehicle comprises a drive element configured to cooperate with the engagement elements.

* * * * *